(12) United States Patent
Wright et al.

(10) Patent No.: US 7,712,294 B2
(45) Date of Patent: May 11, 2010

(54) LAWN MOWER WITH DECK LIFT SYSTEM INCLUDING AUTOMATIC LATCH RESETTING

(75) Inventors: Edward R. Wright, Dickerson, MD (US); Luke B. Waesche, Hagerstown, MD (US); William R. Wright, Clarksburg, MD (US)

(73) Assignee: Wright Manufacturing, Inc., Frederick, MD (US)

( * ) Notice: Subject to any disclaimer, the term of this patent is extended or adjusted under 35 U.S.C. 154(b) by 922 days.

(21) Appl. No.: 11/502,622

(22) Filed: Aug. 11, 2006

(65) Prior Publication Data

US 2008/0034723 A1    Feb. 14, 2008

(51) Int. Cl.
*A01D 34/00* (2006.01)
(52) U.S. Cl. ......................... 56/17.1; 56/16.3
(58) Field of Classification Search .................. 56/16.3, 56/17.1, DIG. 22
See application file for complete search history.

(56) References Cited

U.S. PATENT DOCUMENTS

| | | | |
|---|---|---|---|
| 5,984,031 A | 11/1999 | Velke et al. | |
| 6,085,504 A | 7/2000 | Wright et al. | |
| 6,434,917 B1 | 8/2002 | Bartel | |
| 6,442,917 B1 | 9/2002 | Velke et al. | |
| 6,640,526 B2 | 11/2003 | Velke et al. | |
| 6,658,831 B2 | 12/2003 | Velke et al. | |
| 6,688,089 B2 | 2/2004 | Velke et al. | |
| 6,868,658 B2 | 3/2005 | Velke et al. | |
| 6,935,093 B2 | 8/2005 | Velke et al. | |

*Primary Examiner*—Alicia M Torres
(74) *Attorney, Agent, or Firm*—Nixon & Vanderhye P.C.

(57) ABSTRACT

A power lawn mower includes at least one cutting blade driven, directly or indirectly, by an engine. A cutter deck assembly of the mower includes a cutter deck, cutting blade(s) housed therein, and a pulley/belt system powered by a drive shaft of the engine for driving the cutting blade(s). The cutter deck assembly is selectively adjustable upward/downward to adjust the cutting height of the mower and/or to allow an operator to put the cutter deck assembly in a heightened position for storage and/or transport and thereafter lower the cutter deck assembly to a cutting position. In certain example embodiments of this invention, a latch system is provided as part of a deck lift system for permitting the cutter deck assembly to be more easily and/or efficiently raised/lowered.

21 Claims, 24 Drawing Sheets

LAWN MOWER WITH DECK LIFT SYSTEM INCLUDING AUTOMATIC LATCH RESETTING

This invention relates to a lawn mower including at least one cutting blade driven by an engine. A cutter deck assembly of the mower includes a cutter deck, cutting blade(s) housed therein, and a pulley/belt system powered by a drive shaft of the engine for driving the cutting blade(s). The cutter deck assembly is selectively adjustable upward/downward to adjust the cutting height of the mower and/or to allow one to put the cutter deck assembly in a heightened position for storage and/or transport. In certain example embodiments of this invention, a latch system is provided as part of a deck lift system for permitting the cutter deck assembly to be more easily and/or efficiently raised/lowered.

BACKGROUND OF THE INVENTION

FIG. 1 is a perspective view of a known mower, typically referred to as a mid-mount Z type mower. The mid-mount Z mower of FIG. 1 includes a pair of rear drive wheels 43 each of which is driven by a hydro (hydrostatic or hydraulic) pump so that two pumps are provided, steering levers 15, 16, frame 17, cutter or mower deck assembly 12 below which the blades cut grass, operator seat 18 for a seated operator, gas tank 19, combustion engine 20 located behind the seat, and front caster wheels 37. The mower is a zero radius turning self-propelled power lawn mower, and includes first and second hydro pumps (not shown) for controlling first and second corresponding wheel motors (not shown), so that the first and second independently driven rear drive wheels 43 may be driven independently in order to conduct zero radius turns.

The cutter deck assembly is typically adjustable upwardly/downwardly in order to (a) adjust the cutting height of the mower, and/or (b) allow an operator to move the cutter deck assembly upwardly to a heightened position for storage and/or transport and then back to a lower position following the storage and/or transport for cutting grass. Unfortunately, many deck lift systems are unduly complicated and require too many parts to be commercially and/or practically advantageous.

U.S. Pat. No. 6,868,658, commonly owned and hereby incorporated herein by reference, discloses a deck lift system including an automatic resetting latch. The latch system of an embodiment of the '658 patent includes a deck lift lever for selectively raising and lowering a cutter deck assembly, a pivoting latch for selectively engaging a projection in order to maintain the cutter deck assembly at a given height, and a spring coupled to the pivoting latch in a manner such that the spring biases the pivoting latch in a first rotational direction toward the projection when a longitudinal axis of the spring is on a first side of a pivot axis of the latch. Moreover, the spring biases the pivoting latch in a second opposite rotational direction away from the projection when the axis of the spring is on a second side of the pivot axis of the latch. The longitudinal axis of the spring is switched from the first side of the latch pivot axis to the second side thereof during raising of the cutter deck assembly and is thus first biased by the spring in the first rotational direction toward the projection, and is thereafter biased by the spring in the second opposite rotational direction when the longitudinal axis of the spring is switched to the second side of the pivot axis.

While the deck lift system, including the latch arrangement, of the '658 patent are excellent for their intended purposes, the system is complicated and not always desirable from a commercial perspective in certain applications; there remains room for improvement to simplify the deck lift system.

BRIEF SUMMARY OF EXAMPLE EMBODIMENTS OF THE INVENTION

A cutter deck assembly of the mower includes a cutter deck assembly, at least one cutting blade housed therein, and a pulley/belt system powered by a drive shaft of the engine for driving the cutting blade(s). The cutter deck assembly is selectively adjustable upward/downward to adjust the cutting height of the mower and/or to allow one to put the cutter deck assembly in a heightened position for storage and/or transport. In certain example embodiments of this invention, a latch system is provided as part of a deck lift system for permitting the cutter deck assembly to be more easily and/or efficiently raised/lowered.

In certain example embodiments of this invention, a deck lift system includes a pin (or other rigid projection member) that moves along with a foot or hand actuated lever that is moved by an operator in order to raise/lower the cutter deck assembly. The engine deck may or may not move together with the cutter deck assembly in different example embodiments of this invention.

When the deck lift lever (e.g., foot pedal, hand-actual lever, or the like) is moved in a first direction to a first extent, it ultimately engages a latch and the latch is adapted to engage the pin in order to hold or latch the cutter deck assembly in a relatively high position which may be representative of either a high cutting height or a storage/transport height. When the operator desires to lower the cutter deck assembly back down to a desired grass cutting height, the operator moves the deck lift lever still further forward in the same first direction and the system automatically causes the latch to become unlatched from the pin. Then, when the weight of the deck assembly causes the lever to move in the opposite second direction along with the pin, the pin slips away from the latch and the latch becomes disengaged with the pin thereby permitting the height of the cutter deck assembly to be lowered to a desired grass cutting height as the lever moves in the second direction. When the latch becomes disengaged from the pin, a spring biasing force causes the latch to automatically assume a reset position so as to be ready for the next raising of the cutter deck height.

In certain example embodiments of this invention, in order to maintain the cutter deck assembly at a desired grass cutting height during mower operation or otherwise, the lever engages a selectively adjustable stop member (e.g., height adjustment pin) which prevents the weight of the cutter deck assembly from moving the lever further in the second direction and thus stops the cutter deck assembly from being lowered further thereby setting a desired cutting height.

Such a system is advantageous, for example and without limitation, in that it permits an operator to raise and/or lower the height of the cutter deck assembly using only one limb (e.g., using only one foot, or using only one arm) in certain example embodiments of this invention. Thus, an operator, for example, may be able to more easily raise/lower the height of the cutter height assembly while the operator is sitting on or operating the mower. Moreover, the system operates in an efficient manner and is practical in commercial applications.

In certain example embodiments of this invention, a transport position retaining system is provided to prevent the latch from becoming disengaged from the pin when the cutter deck assembly is in the transport/storage position, and thus to prevent the cutter deck assembly from unexpectedly dropping during typical transport operations. In certain example embodiments of this invention, the transport position retaining system includes an anti-unlatch spring that biases the deck lift lever and thus the pin into engagement with the latch, even when the deck lift arm moves (e.g., as a result of a truck or trailer carrying the mower going over bumps on the road) during typical transport conditions. Thus, the anti-unlatch spring(s) keeps biasing pressure on the deck lift lever and pin so that the pin cannot become easily disengaged from the latch during typical transport conditions.

In certain example embodiments of this invention, there is provided a power lawn mower including a deck lift system for raising and lowering a cutter deck assembly of the mower comprising: a pivotal deck lift lever for selectively raising and lowering the cutter deck assembly of the mower when the lever is pivoted about a pivot axis, a latch pin being connected to the deck lift lever for movement therewith; a pivotal latch adapted to engage the latch pin; wherein, when the latch is not contacting the latch pin, a biasing member applies a biasing force against the latch to position the latch in a first position so that the latch is ready to engage the latch pin should an operator raise the cutter deck assembly; wherein, when the deck lift lever is moved in a first direction to a first extent from a grass cutting position, the latch engages and latches the latch pin in order to hold the cutter deck assembly in a raised position, and when the deck lift lever is moved still further to a second extent in the same first direction force applied against the latch causes the latch to become unlatched from the latch pin thereby releasing the latch pin; and wherein, when weight of the cutter deck assembly causes the lever to move in the opposite second direction along with the latch pin after the latch pin has been released by the latch, the latch is disengaged with the latch pin and the biasing member automatically resets the latch to the first position, and the height of the cutter deck assembly is lowered to a desired grass cutting height as the lever moves in the second direction and comes into contact with a stop member which is for maintaining a grass cutting height of the cutter deck assembly.

In other example embodiments of this invention, there is provided a lawn mower comprising: a deck lift lever for selectively raising and lowering a cutter deck assembly of the mower, an engagement member being connected to the deck lift lever for movement therewith; a pivotal latch adapted to engage the engagement member; wherein, when the cutter deck assembly is at a first grass cutting height, a biasing member applies a biasing force against the latch to position the latch in a first position so that the latch is ready to engage the engagement member should an operator raise the cutter deck assembly; wherein, when the deck lift lever is moved in a first direction to a first extent from a grass cutting position, the latch engages and latches the engagement member in order to hold the cutter deck assembly in a raised position, and when the deck lift lever is moved still further to a second extent in the same first direction the latch becomes unlatched from the engagement member; and wherein, when the deck lift lever moves in the opposite second direction along with the engagement member after the engagement member has been released by the latch, the biasing member automatically resets the latch to the first position.

DETAILED DESCRIPTION OF EXAMPLE EMBODIMENTS OF THE INVENTION

Figure 1:
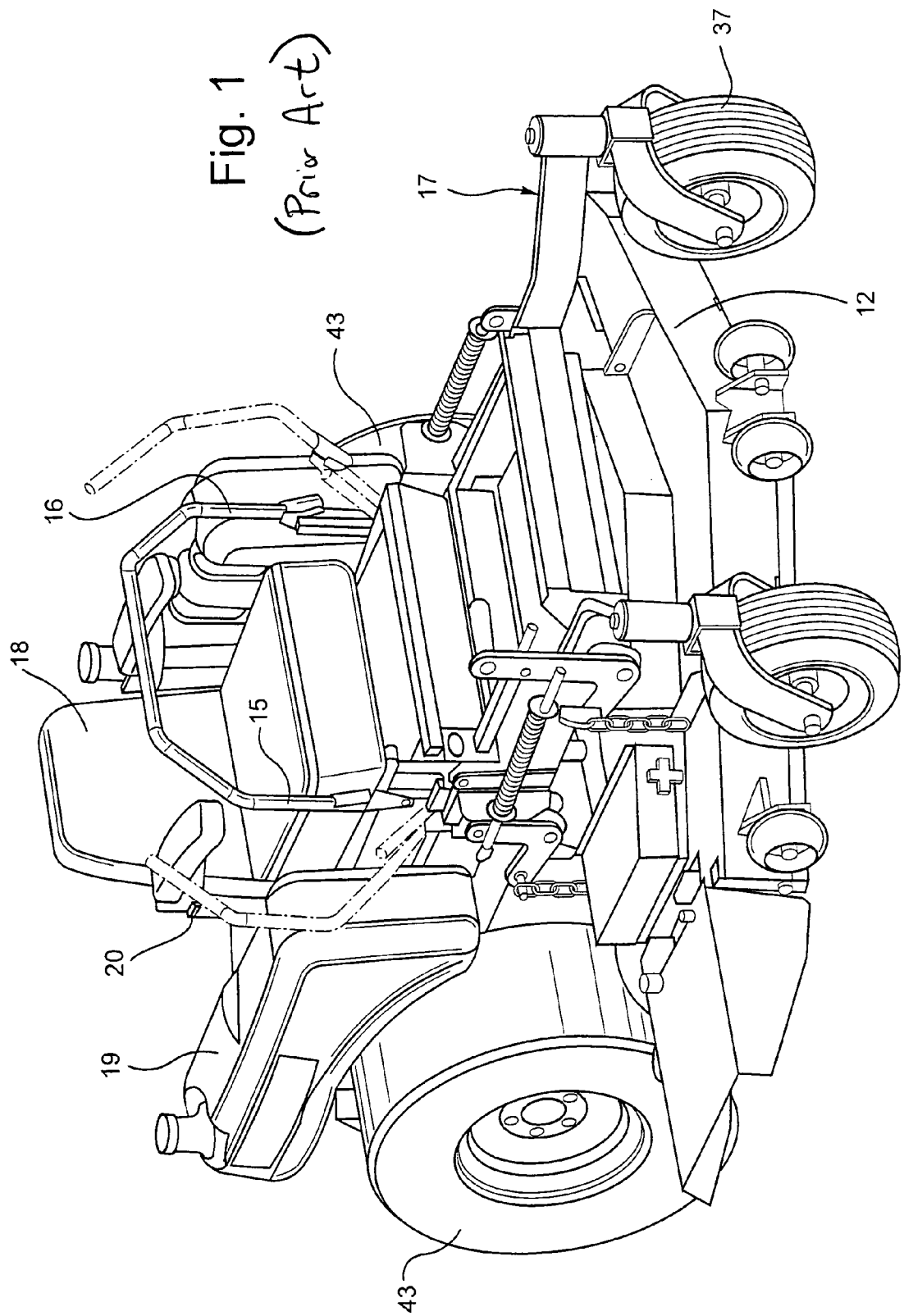
FIG. 1 is a perspective view of a conventional zero radius turning riding mower.

Referring now more particularly to the accompanying drawings in which like reference numerals indicate like parts throughout the several views.

Figure 2:
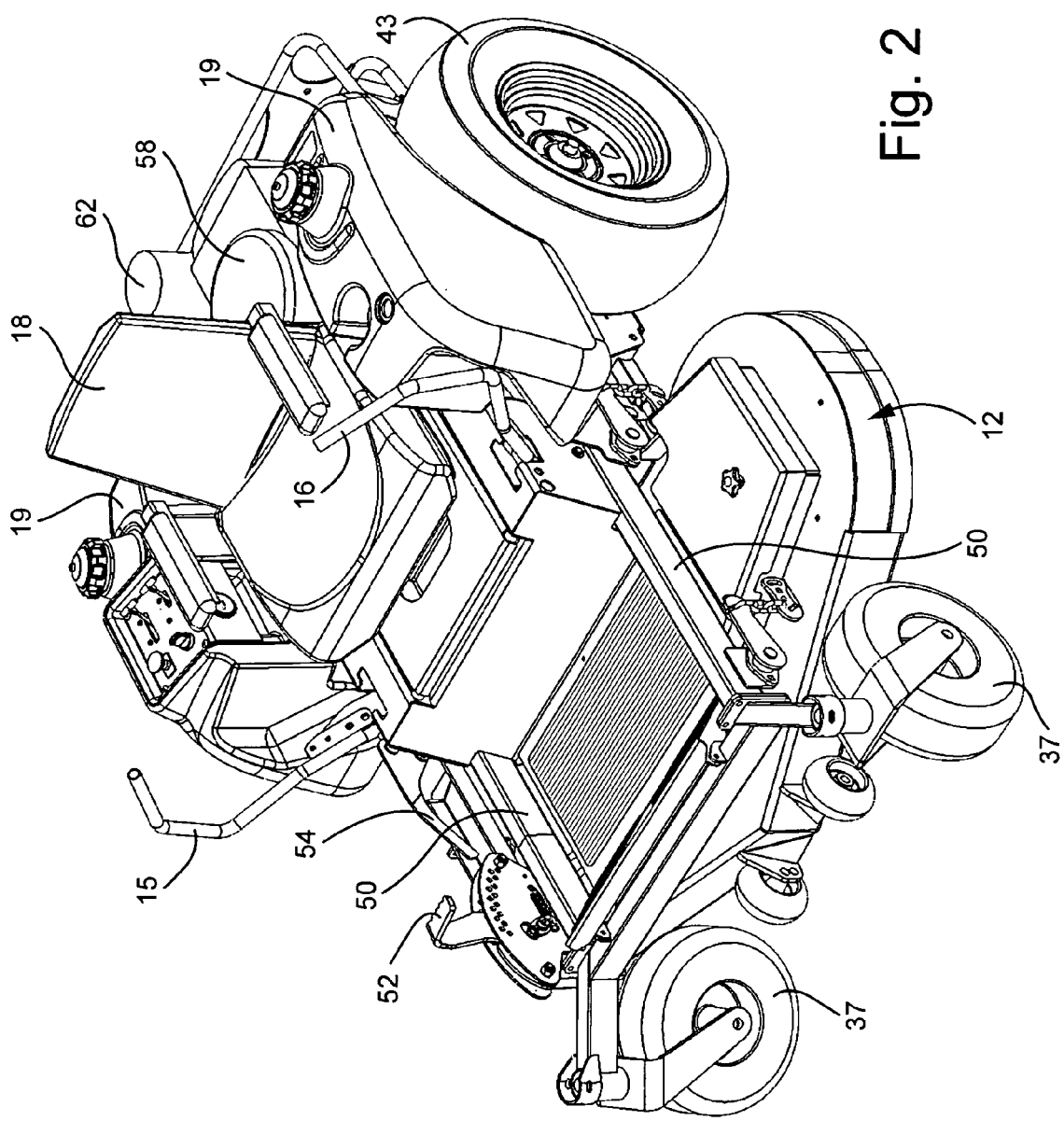
FIG. 2 is a perspective view of a zero radius turning lawn mower according to an example embodiment of this invention.
Figure 3:
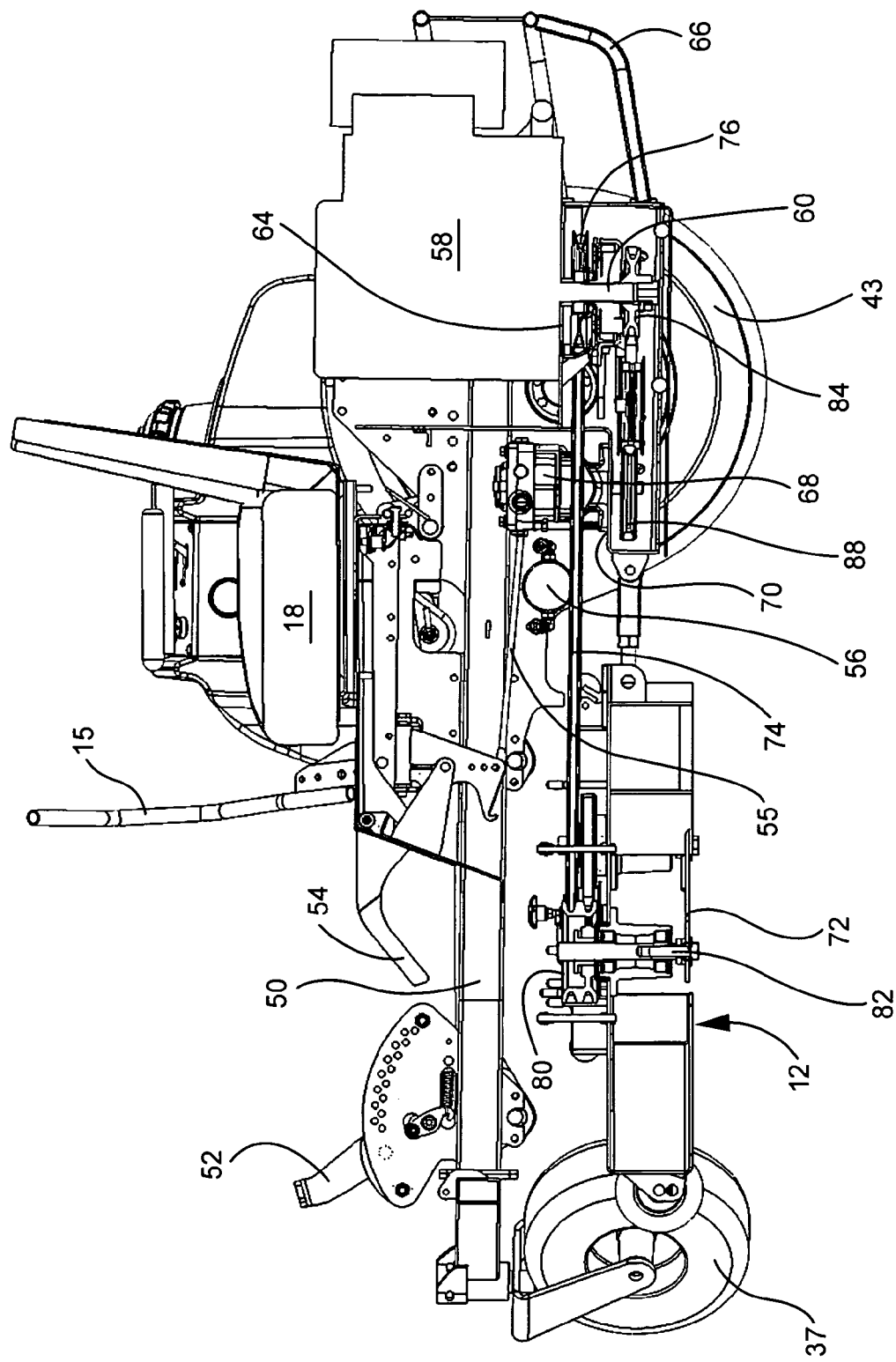
FIG. 3 is a side cross sectional view of the mower of FIG. 2.
Figure 4:
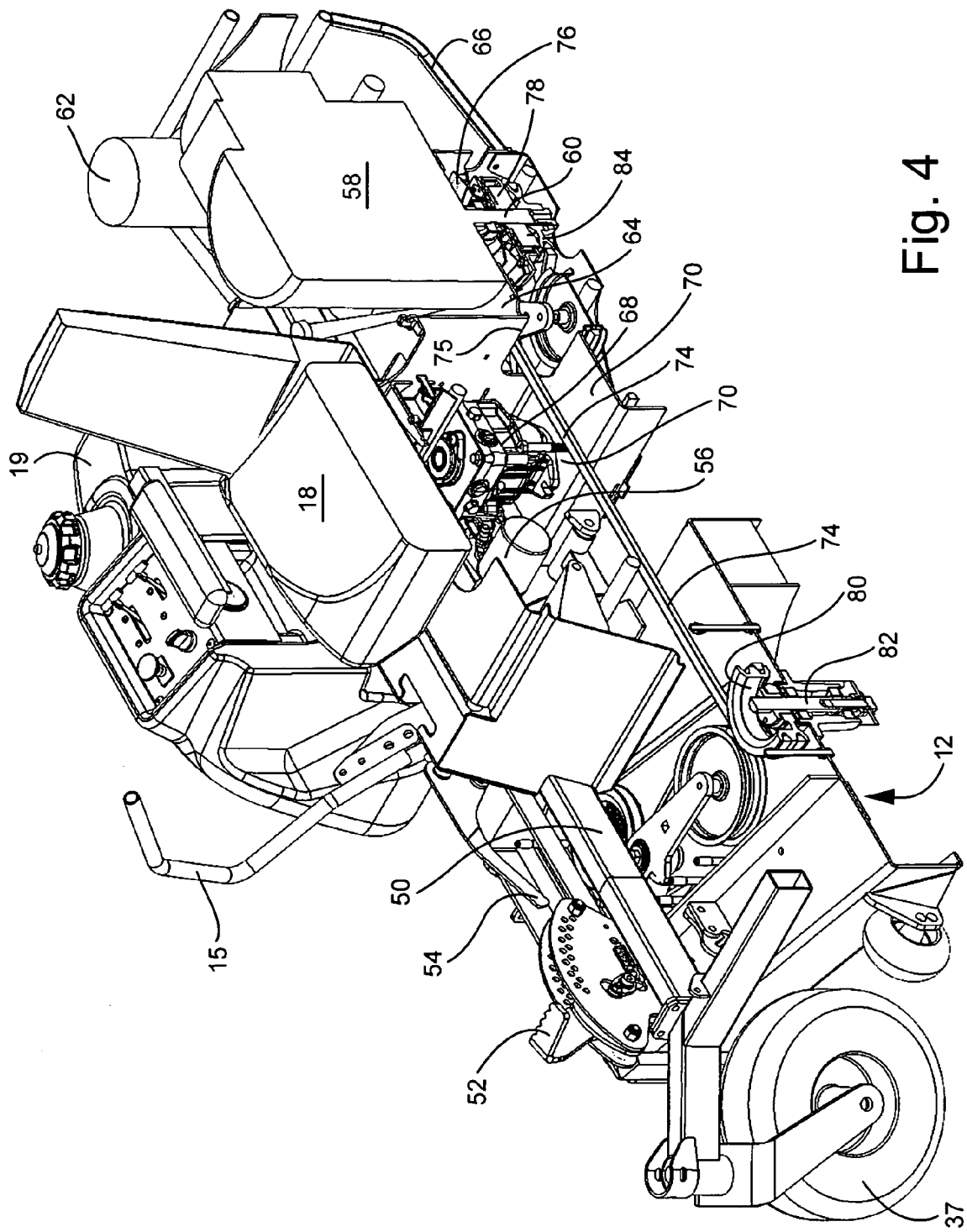
FIG. 4 is a split perspective view of the mower of FIGS. 2-3, showing the right half of the mower only, for purposes of illustration and understanding (the mower has been sliced down the middle in FIG. 4 so that only the right half of the mower is illustrated, and parts that have been sliced are shown cross sectionally).
Figure 5:
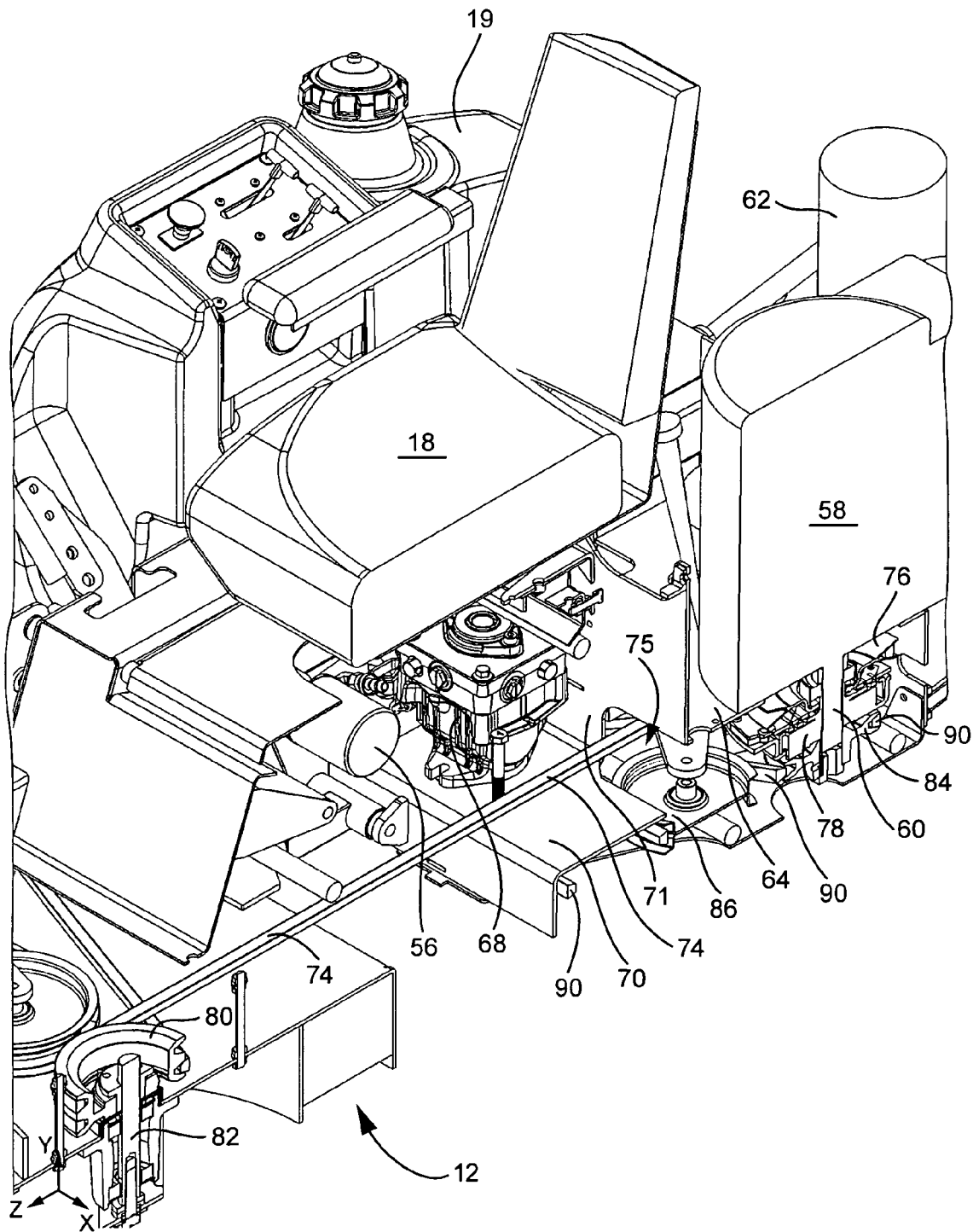
FIG. 5 is a close-up split perspective view of the mower of FIGS. 2-4, showing the right half of the mower only, for purposes of illustration and understanding (the mower has been sliced down the middle in FIGS. 4-5 so that only the right half of the mower is illustrated, and parts that have been sliced are shown cross sectionally).
Figure 6:
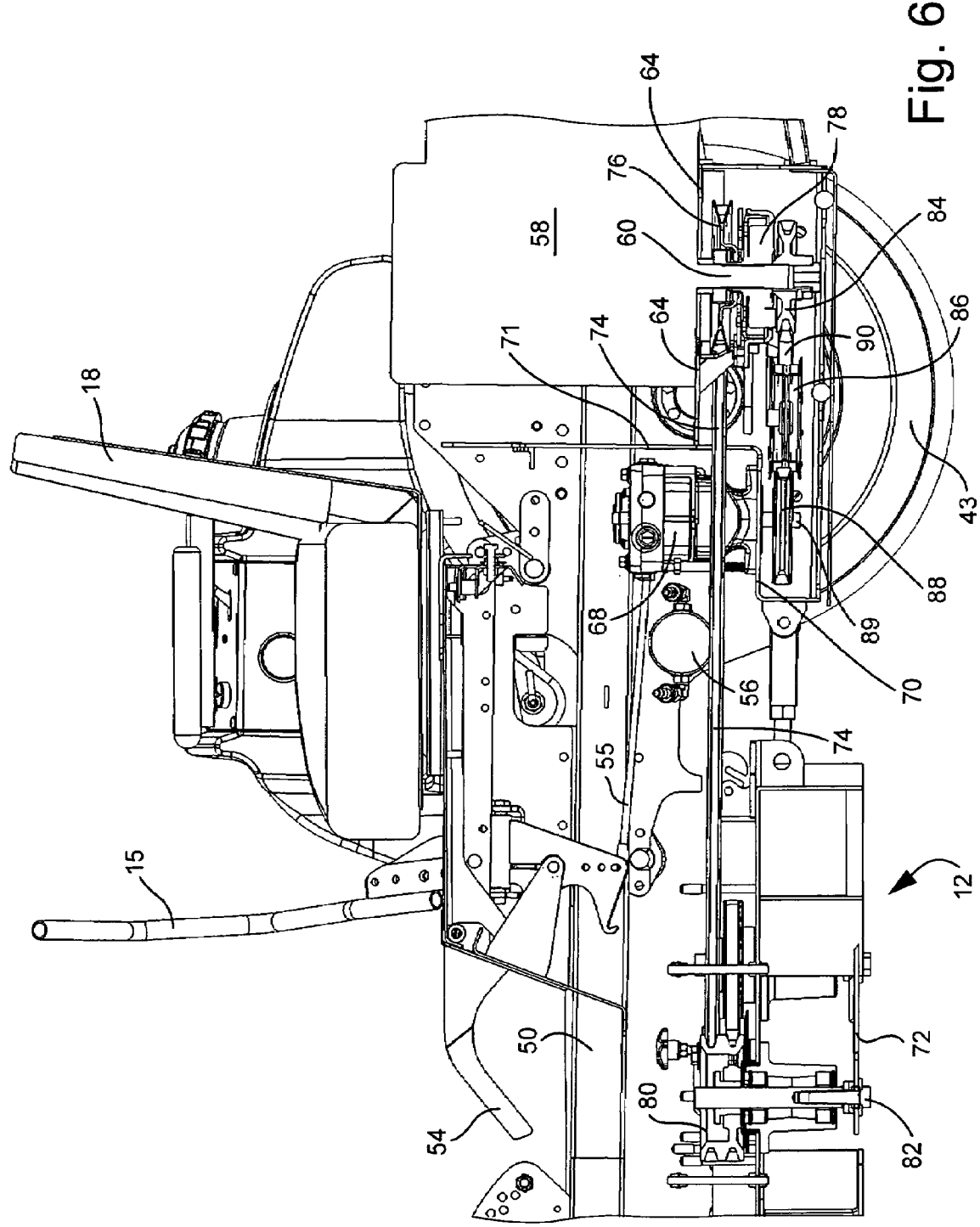
FIG. 6 is a close-up side cross sectional view of the mower of FIGS. 2-5, where the section line is taken where the slice is shown in FIGS. 4-5.
Figure 7:
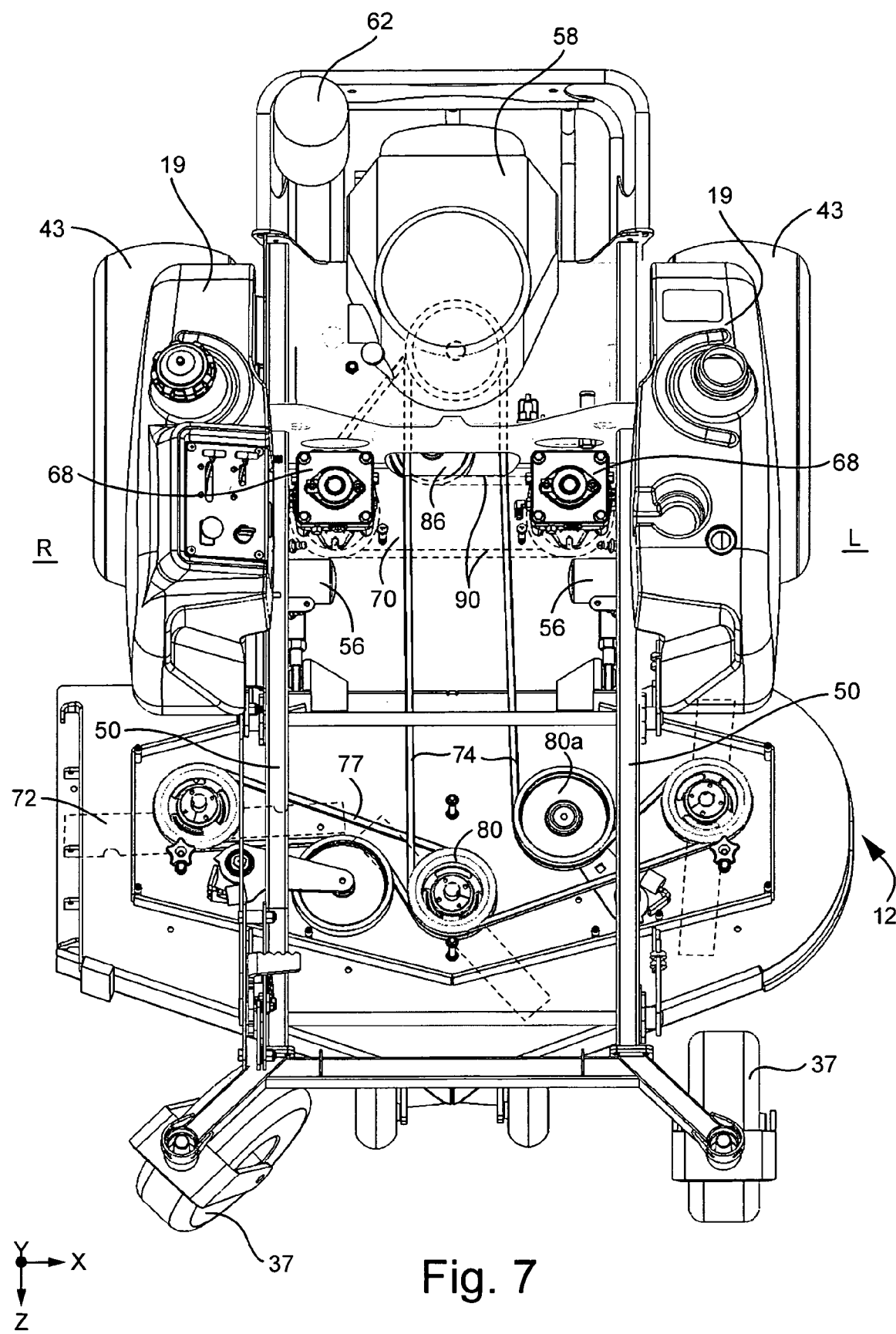
FIG. 7 is a top plan view of the mower of FIGS. 2-6, although certain components of the mower are either not shown or are translucent in this figure for purposes of illustration and understanding.
Figure 8:
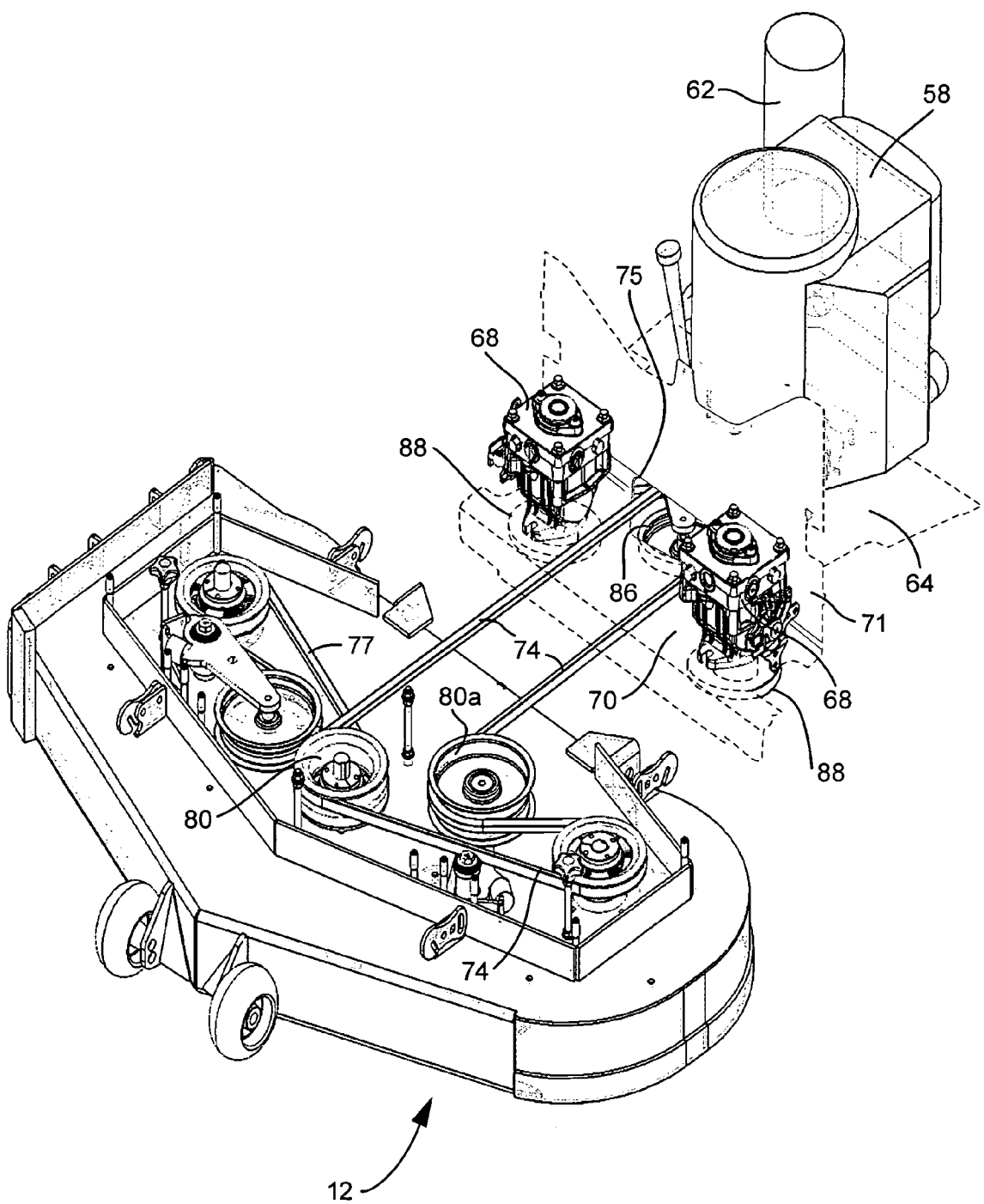
FIG. 8 is a perspective view of certain components of the mower including the cutter deck assembly, cutter deck pulleys, cutter deck drive belt, pumps and engine of the mower of FIGS. 2-7 (other parts are either omitted from or translucent in this figure for purposes of illustration and understanding).
Figure 9:
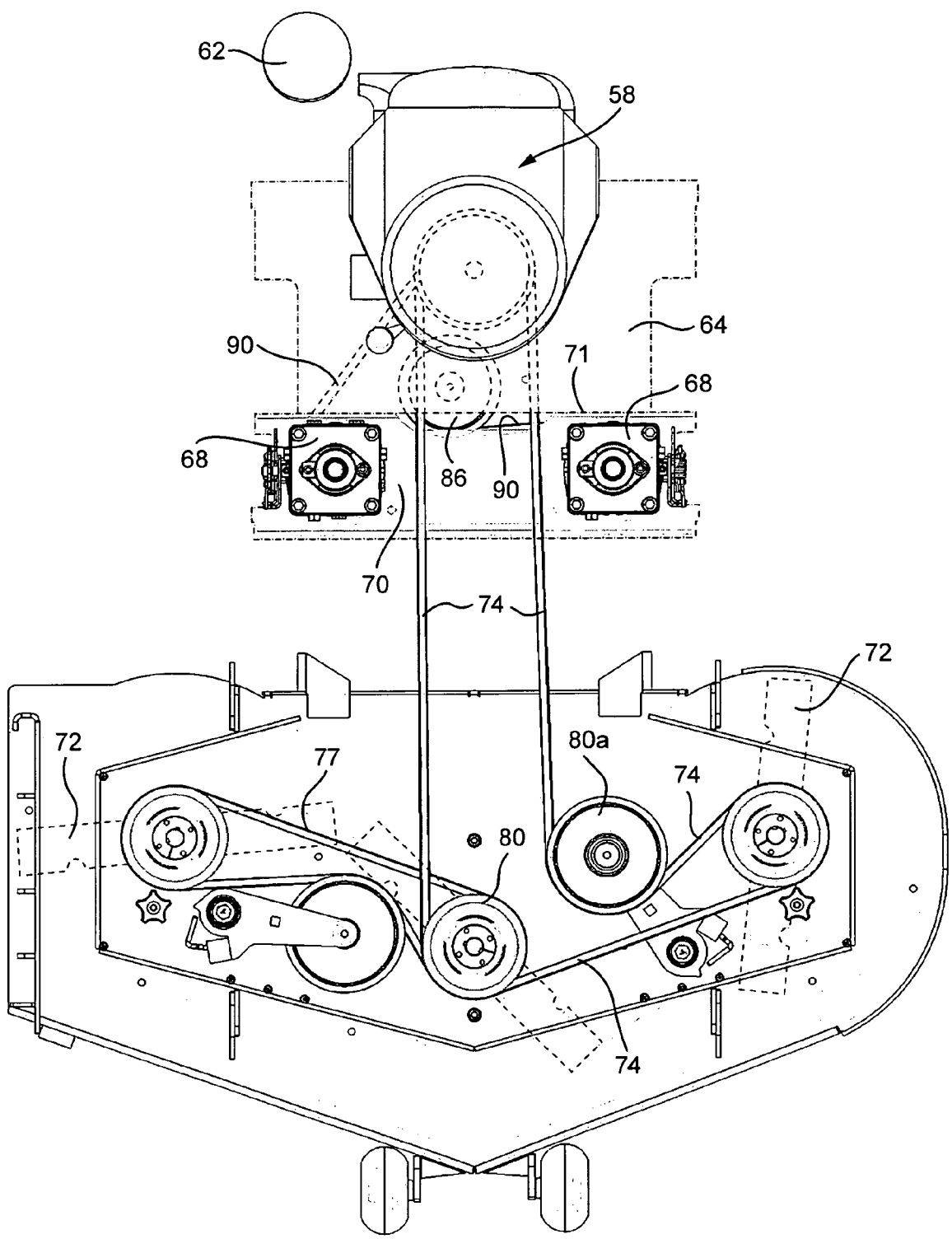
FIG. 9 is a top view of certain components of the mower including the cutter deck assembly, cutter deck pulleys, cutter deck drive belt, pumps and engine of the mower of FIGS. 2-8 (other parts are either omitted from or translucent in this figure for purposes of illustration and understanding).
Figure 10:
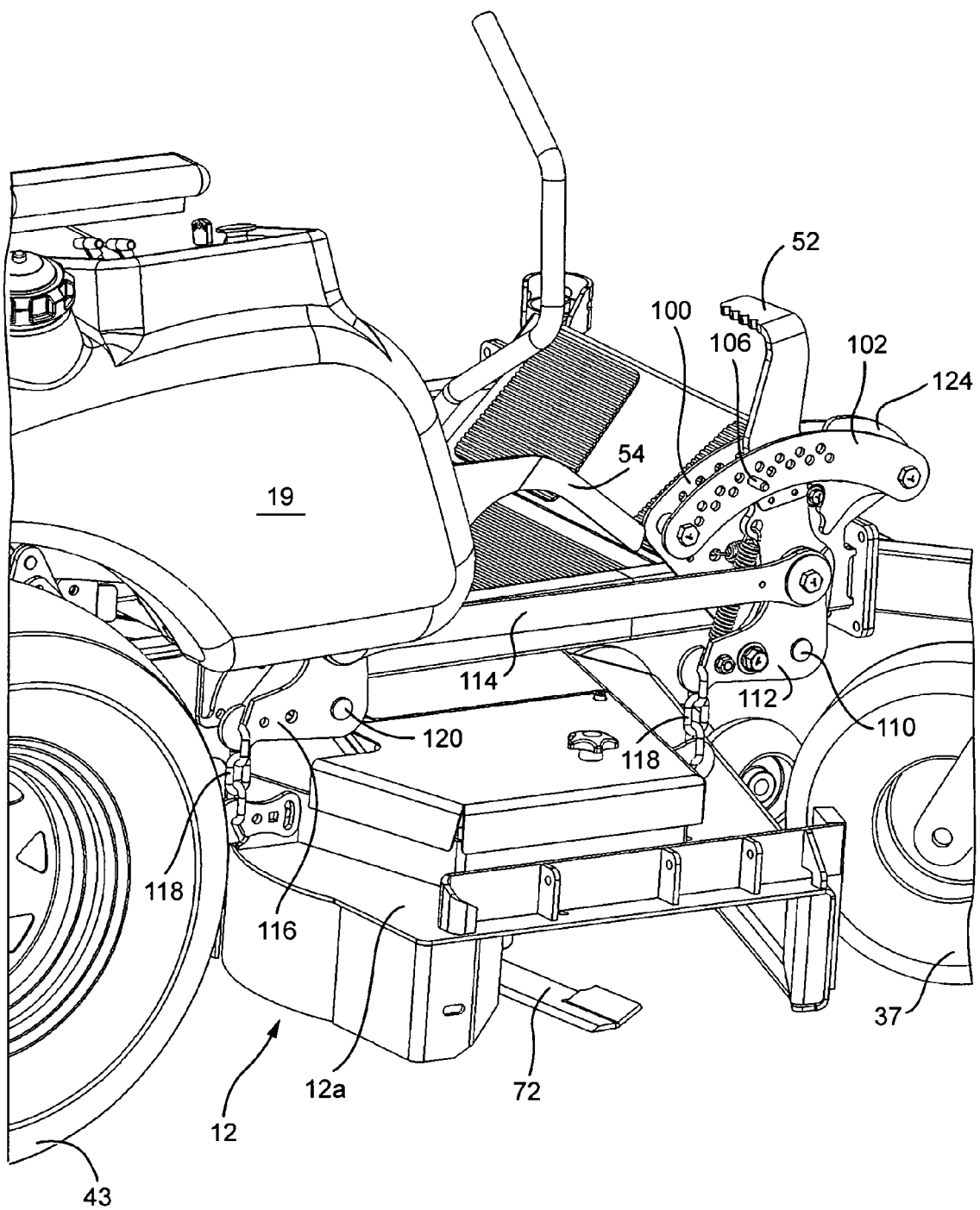
FIG. 10 is a perspective view taken from the right side of the mower of FIGS. 2-9 illustrating a deck lift system according to an example embodiment of this invention.
Figure 11:
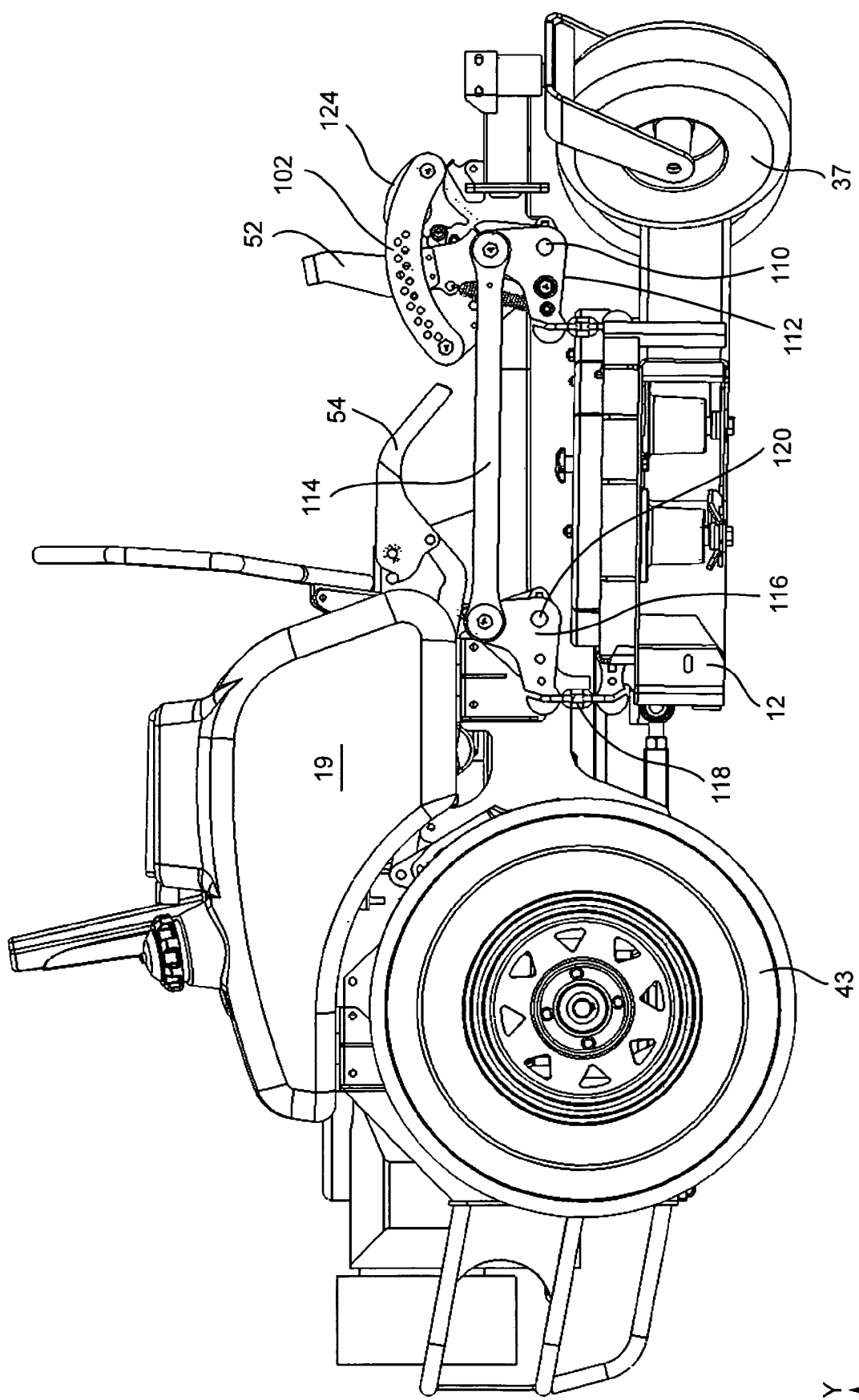
FIG. 11 is a side plan view of the mower of FIGS. 2-10, taken from the right side of the mower.
Figure 12:
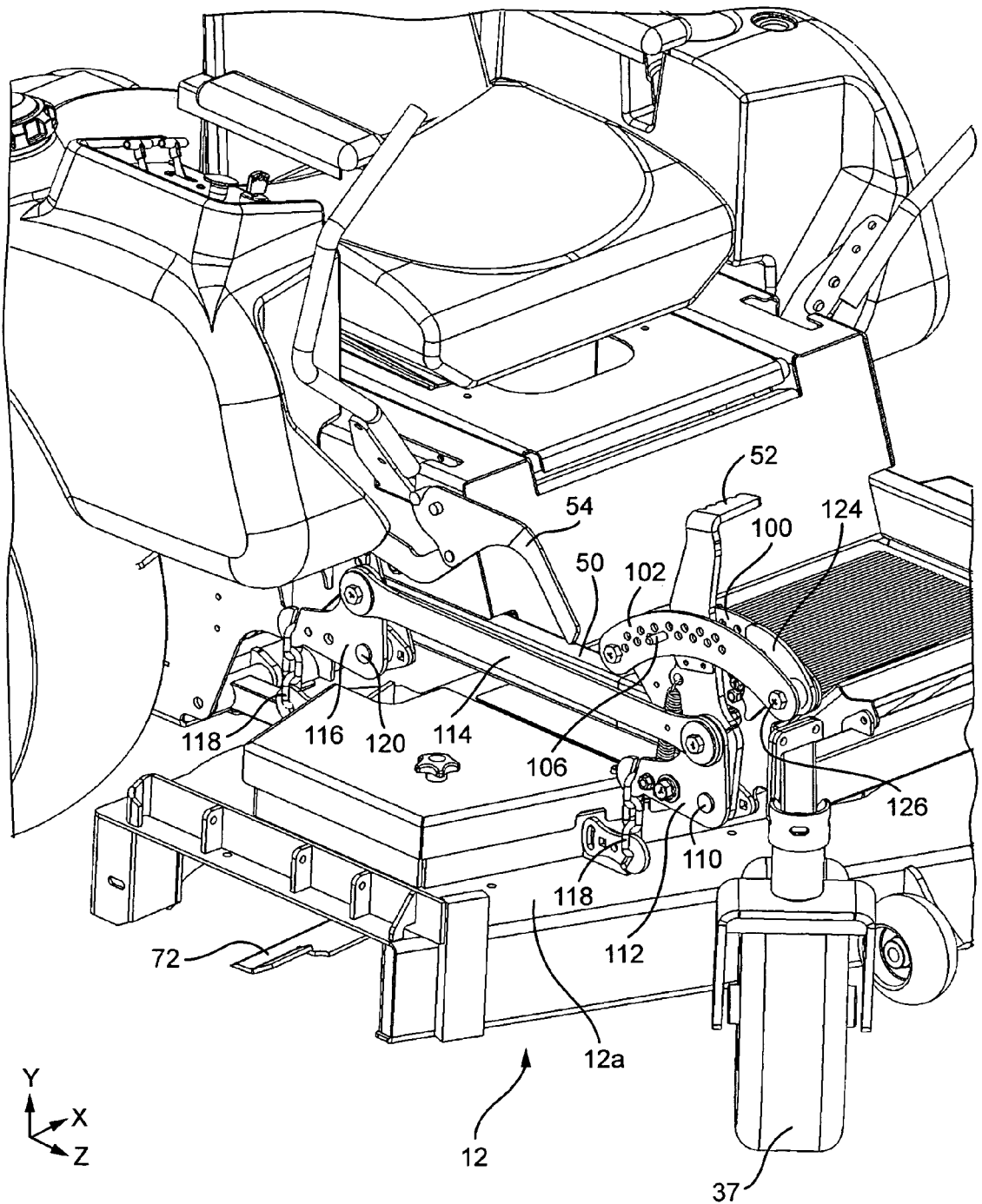
FIG. 12 is a perspective view taken from the front right side of the mower of FIGS. 2-12 illustrating the deck lift system according to an example embodiment of this invention.

FIGS. 2-19, for purposes of example only and without limitation, illustrate an example zero radius turning lawn mower according to an example embodiment of this invention. FIG. 2 is a perspective view of the mower; FIG. 3 is a side cross sectional view of the mower; FIGS. 4-5 are split perspective views of the mower showing the right half of the mower only for purposes of illustration and understanding only (the mower has been sliced down the middle in FIGS. 4-5 so that only the right half of the mower is illustrated, and parts that have been sliced are shown cross sectionally); FIG. 6 is a close-up side cross sectional view of the mower; FIG. 7 is a top plan view of the mower although certain components of the mower are either not shown or are translucent in this figure for purposes of illustration and understanding; FIG. 8 is a perspective view of certain components of the mower; and FIG. 9 is a top view of certain components of the mower. The view of FIGS. 10-19 are discussed above.

Referring to FIGS. 2-19, and as perhaps best shown in FIGS. 2-9, the example mower is of the zero radius turning type and includes cutter deck assembly 12 (including cutter deck 12a), steering or hand control levers 15, 16 for manipulation by the operator to steer the mower, seat 18 for supporting a sitting operator of the mower, fuel (e.g., gas) tank(s) 19 for holding fuel for the combustion engine, front caster wheels 37, rear drive wheels 43, tractor frame 50, deck lift foot pedal or lever 52 for raising/lowering the cutter deck assembly 12 to adjust the cutting height of the mower or the like, brake lever 54 for applying a braking force to one or more of the rear drive wheels 43 of the mower, control rod 55, oil filter 56, combustion engine 58, engine drive shaft 60 which is driven by the engine 58 and extends downwardly from a bottom portion of the engine 58, muffler 62 for the engine, engine deck 64 upon which the engine 58 is mounted, engine guard 66 for guarding the engine, first and second hydro (hydrostatic or hydraulic) pumps 68 which control the drive speed and direction of the first and second drive wheels 43, respectively, pump deck 70 on which the pumps 68 are mounted, cross wall 71 which is substantially vertical (e.g., vertical plus/minus about 20 degrees) and which extends between at least the pump deck 70 and the engine deck 64, cutting blade(s) 72 provided in the cutter deck assembly 12 for cutting grass, cutter deck drive belt 74 which is driven by the engine 58 and extends between the engine drive shaft 60 and the cutter deck assembly 12, at least one aperture 75 defined in the cross wall 71 through which first and/or second substantially parallel portions of the cutter deck drive belt 74 are fed and move during mower operation, cutter deck engine pulley 76 operatively connected to the engine shaft 60 for rotation therewith and on which the cutter deck drive belt 74 is mounted, electromagnetic clutch/brake 78 operatively connected to the engine shaft 60 for clutching/braking the cutter deck engine pulley 76 and cutter deck drive belt 74 so as to permit the cutter deck drive belt 74 to be selectively actuated by the operator when the engine is running, blade pulley 80 mounted in the cutter deck which supports the end of the cutter deck drive belt 74 opposite the end supported by the pulley 76, additional pulley 80a also driven by the front portion of belt 74, and blade spindle 82 which rotates along with the pulley 76 and permits the belt 74 to drive the cutting blade(s) of the mower. As explained above, in certain example embodiments cross wall 71 is substantially vertical and extends between at least the pump deck 70 and the engine deck 64; however it is possible that wall 71 need not be substantially vertically oriented (e.g., it may be from about 40-70 degrees from vertical) in alternative embodiments of this invention.

Pump belt drive system includes pump drive engine pulley 84 mounted on the engine shaft 60 for rotation therewith, pump drive idler pulley 86, a pump pulley 88 mounted beneath each pump 68 and which rotates with the drive shaft 89 of each corresponding pump, and a pump drive belt 90 which is driven by the engine shaft 60 and which is mounted on each of pulleys 84, 86 and 88. In certain example embodiments, the pulleys 84, 86 and 88 are all substantially in a common plane which is below a plane of the pump deck and which is below a plane of the belt 74. In certain example embodiments, idler pulley 86 is provided on a swinging idler arm and is spring biased to maintain pump belt tension. A single pump belt 90 drives both pumps (via pulleys 84, 86, 88) in certain example embodiments of this invention (such as in the figures); however, in alternative embodiments of this invention one or more additional pump belt(s) may be provided.

In certain example embodiments of this invention, components such as the tractor frame 50, pump deck 70, engine deck 64 and cutter deck are made of sheet metal. However, it is possible that other materials may instead be used to fabricate these components.

In certain example embodiments, the mower is a riding mower, and the seat 18 of the mower is positioned laterally forward of at least part of the engine 58. However, in alternative embodiments of this invention the mower may be operated by a standing operator or the like and seat 18 may or may not be provided. While this invention may be implemented on a mid-mount Z type mower in certain example embodiments of this invention, this invention is not so limited and may also be implemented on other types of mowers.

As perhaps best shown in FIGS. 4, 7, 8 and 9, the mower may include first 74 and second 77 cutter deck drive belts both being located at elevation(s) or in plane(s) above the pump belt 90. In FIGS. 7-9, it can be seen that both cutter deck drive belts 74, 77 are mounted on pulley 80 but at slightly different elevations, so that pulley 80 allows drive from the engine to be transferred to belt 77 via belt 74. Each belt 74, 77 may drive different cutting blade(s) of the mower. Other belts may be provided in alternative embodiments of this invention; and only a single belt may be provided in still further alternative embodiments of this invention.

In certain example embodiments, the height of the cutter deck assembly 12 and thus the cutting height of the mower is adjustable using a deck lift system. In certain example embodiments, the cutter deck assembly 12 moves upwardly and downwardly to adjust a cutting height of the mower and is not fixedly connected to the engine deck, so that the engine deck does not move upwardly and downwardly along with the cutter deck assembly.

An example deck lift system and transport position retaining system according to an example embodiment of this invention are perhaps best shown in FIGS. 10-19. Referring to FIGS. 10-19 for example, the deck lift system may include deck lift lever 52 which may be a deck lift foot pedal as shown in the figures or alternatively which may be a hand-actuated deck lift lever, fixed arc-shaped inner height adjustment plate 100, fixed arc-shaped outer height adjustment plate 102 which is substantially parallel to plate 100, matching holes 104 defined in the height adjustment plates 100, 102 for allowing a height adjustment pin to be selectively positioned in different matching holes in order to set a cutting height of the mower, height adjustment pin 106 adapted to be positioned in any desired pair of matching holes 104 of the height adjustment plates 100, 102 so as to extend between the two plates and to adjust the cutting height of the mower by setting the lower limit of the cutter deck assembly 12 height when lever 52 comes into engagement therewith, latch pin 108 affixed to deck lift lever 52 for movement therewith when the lever 52 pivots about deck lift pivot shaft 110 when moved by the operator to raise/lower the deck assembly height, a pair of substantially parallel front deck lift arms 112 mounted on opposite ends of shaft 110 on the right and left sides of the mower and which pivot about shaft 110 when they rotate about shaft 110 along with deck lift lever 52, bearing housing 109 and sleeve bearing 111 mounted on deck lift shaft 110 so as to allow the deck lift lever 52 to float relative to the shaft 110 (but the degree of floating is limited due to spacers 121, 123 in channels/apertures 125 to be discussed below), elongated deck lift connecting linkage 114 extending between and connecting from deck lift arms 112 and rear deck lift arms 116 so that the deck lift arms 112 and 116 all pivot simultaneous to lift/lower the deck assembly, vertically extending deck lift chains 118 which extend between the deck lift arms 112, 116 and the cutter deck assembly 12 so as to permit the cutter deck assembly 12 to be raised and lowered along with pivoting movement of the deck lift arms 112, 116 about respective deck lift arm pivot axes/shafts 110, 120 (chains 118 are connected to the deck lift arms even though they may be shown unattached in certain figures herein), deck lift pivots shafts 110 and 120 extending across the width of the mower at respective front and rear areas above the cutter deck assembly so as to each connect a pair of deck lift arms on both sides of the mower for lifting/lowering the cutter deck assembly so that the cutter deck assembly is lifted/lowered at four different points forming a rectangle as viewed from above, fine deck pitch adjustment members 122 to which the deck lift chains 118 may be attached on the cutter deck assembly side, large spacer 121 and small spacer 123 affixed to the deck lift arm 112 and which move in channels or apertures 125 defined in the lever 52 until hitting an edge of such channels/apertures 125 (or the lever 52 moves relative to spacers 121, 123 and deck lift arm 112 until edges of channels/apertures 125 engage the spacers and thereafter cause the deck lift arm 112 and shaft 110 to pivot along with the lever 52 about axis 110), washers 127 mounted over and partially covering channels/apertures 125 and helping mount the spacers, automatic resetting latch 124 for engaging with and latching onto latch pin 108 in order to lock or latch the cutter deck assembly in a relatively high position which may be representative of either a high cutting height or a storage/transport height for use when the mower is being stored or transported (e.g., on a trailer or truck between jobs), latch pivot 126 about which latch 124 pivots during raising/lowering of the cutter deck assembly 12, latch position retaining arm 128 which pivots about retaining arm pivot 130, latch position retaining roller or bearing 132 mounted on an end or other appropriate portion of latch position retaining arm 128, latch position retaining spring 134 which provides a biasing force on latch position retaining arm 128 in order to bias the retaining arm 128 (and the roller or bearing 128 mounted on arm 128) into contact with the latch 124, and anti-unlatch spring 136 for biasing the lever 52 and thus the pin 108 into engagement with the latch 124 even when the deck lift arm moves (e.g., as a result of a truck or trailer carrying the mower going over bumps on the road) during typical transport conditions so that the spring 136 helps keep biasing pressure on the lever 52 when the cutter deck assembly is in the transport/storage position so that the pin 108 cannot become easily disengaged from the latch 124. In certain example embodiments of this invention, one, two, three or all of latch 124, deck lift arm 112, a main body portion of lever 52, and plates 100, 102 are substantially parallel to one another (e.g., when viewed from above). Latch 124 pivots about 126 when the deck assembly 12 is raised or lowered from the transport position. In certain example embodiments, the latch position retaining spring 134 and the anti-unlatch spring 136 may form an angle of from about 20-75 degrees with one another when viewed from the side, more preferably from about 30-60 degrees.

Generally speaking, the deck lift system may operate as follows in certain example embodiments of this invention, still referring to FIGS. 10-19. Latch pin 108 (or other rigid projection member) moves along with a foot or hand actuated lever 52 in order to raise/lower the cutter deck assembly 12. The engine deck 64 may or may not move together with the cutter deck assembly 12 in different example embodiments of this invention, but the lever 52 causes at least the cutter deck assembly to move up/down. When the deck lift lever 52 is moved in a first direction (e.g., pivoted about axis 110 toward the front of the mower in the embodiment in the figures) to a first extent, latch 124 is adapted to engage the pin 108 in order to hold or latch the cutter deck assembly in a relatively high position which may be representative of either a high cutting height or a storage/transport height (e.g., a first click position) (e.g., see FIGS. 13(*d*) and 14-17 which illustrate the storage/transport position). Then, when the lever 52 is moved still further forward in the same first direction the system automatically causes the latch 124 to become unlatched from the pin 108 (e.g., a second click position) (e.g., see FIG. 13(*e*)), and when the weight of the deck assembly 12 causes the lever 52 to move in the opposite second direction (e.g., pivoted about axis 110 toward the rear of the mower in the embodiment in the figures) along with the pin 108 the latch 124 becomes disengaged with the pin 108 thereby permitting the height of the cutter deck assembly 12 to be lowered to a desired grass cutting height as the lever moves in the second direction and the deck assembly 12 is lowered (e.g., see FIG. 13(*f*) and then FIG. 13(*a*)). When the latch 124 becomes disengaged from the pin 108, a spring biasing force from spring 134 and thus biasing arm member 128 causes the latch 124 to automatically assume a reset position so as to be ready for the next raising of the cutter deck height (e.g., see FIG. 13(*a*)). Such a system is advantageous in that it permits an operator to raise and lower the height of the cutter deck assembly using only one limb (e.g., using only one foot, or using only one arm) in certain example embodiments of this invention, and the latch 124 is automatically reset each time the deck is lowered from a storage/transport position to a cutting height position. Thus, an operator, for example, may be able to more easily raise/lower the height of the cutter height assembly while the operator is sitting on or operating the mower with less operator movement needed.

Figure 13A:
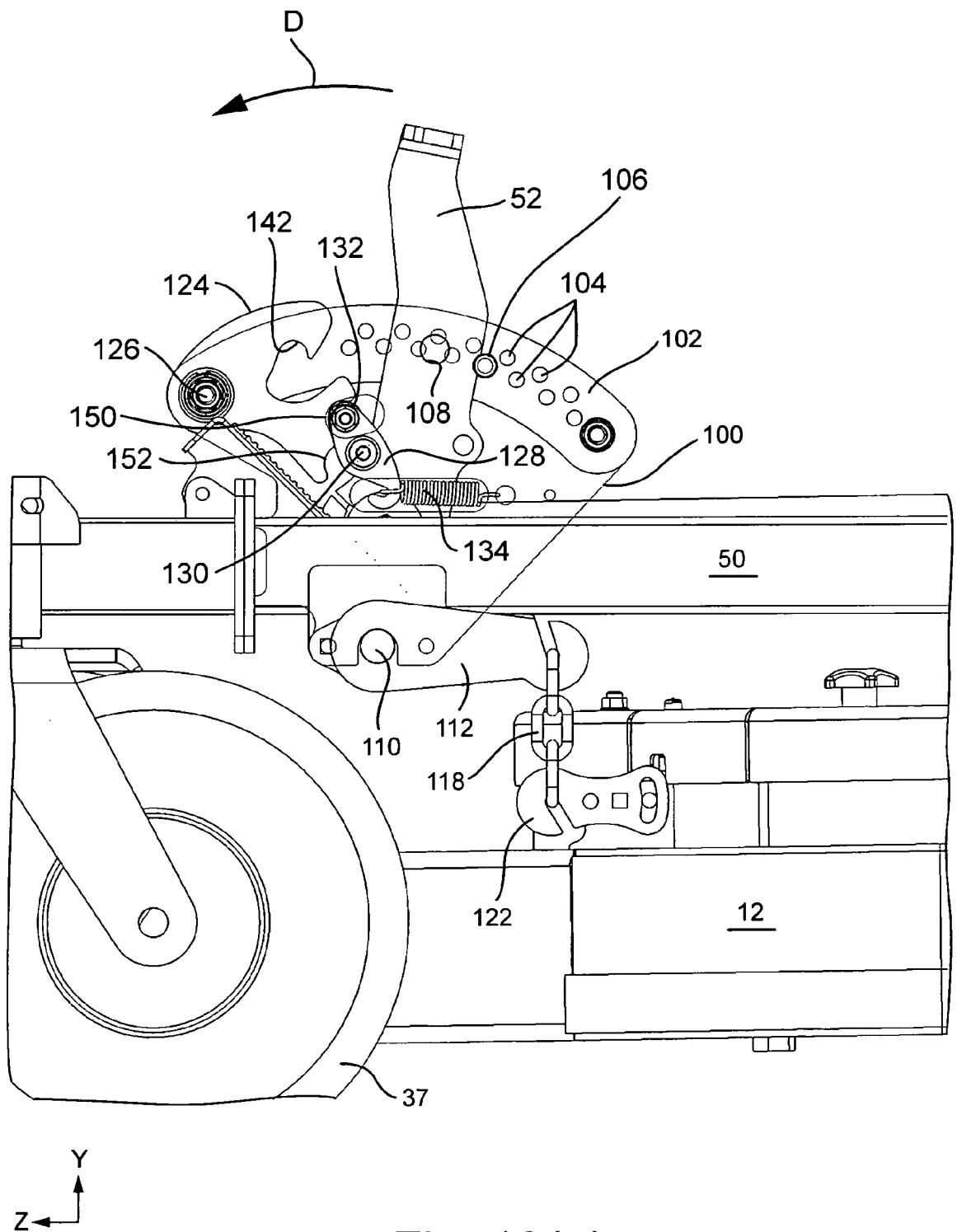
FIGS. 13(a) through 13(f) are side plan views (taken from the left side of the mower of FIGS. 2-12, and with certain components removed for purposes of illustration and simplicity) illustrating on a step-by-step basis certain components of the deck lift system as the cutter deck starts at a given grass cutting height, is raised to a storage or transport height and is latched at that height, and is then lowered back to the grass cutting height; note that the inner height adjustment plate is illustrated in a translucent manner in these figures for purposes of simplicity and understanding.

A detailed description of how an example embodiment of the deck lift system operates will now be described, referring to FIGS. 10-19 (although certain of these figures may be singled out as perhaps best illustrating certain features or positions). FIG. 13(a) illustrates the deck lift system when the mower is cutting grass (i.e., the cutter deck assembly is at a grass cutting height), where the cutter deck assembly 12 is in a relatively low position. In particular, FIG. 13(a) illustrates that to maintain the cutter deck assembly 12 at a desired grass cutting height during mower operation or otherwise, the lever 52 engages a selectively adjustable stop member (e.g., height adjustment pin) 106 mounted in holes 104 in the height adjustment plates 100, 102, and the engagement of the lever 52 on stop member 106 prevents the weight of the cutter deck assembly 12 from moving the lever 52 further in the second direction (e.g., toward the rear of the mower in the figures) and thus the cutter deck assembly 12 from being lowered further so that a cutting height can be substantially maintained. Note that when the latch pin 108 is not engaged with the latch 124, the latch position retaining spring 134 biases the latch position retaining arm 128 into contact with the latch 124 so that the latch position retaining roller or bearing 132 mounted on the retaining arm 128 is contacting and resting in first detent 150 defined in the edge of the latch 124 (see FIG. 13(a)). In other words, spring 134 and arm 128 are retaining the latch 124 in a position ready to accept the latch pin 108 should the operator decide to raise the cutter deck assembly (in a reset position).

Figure 13B:
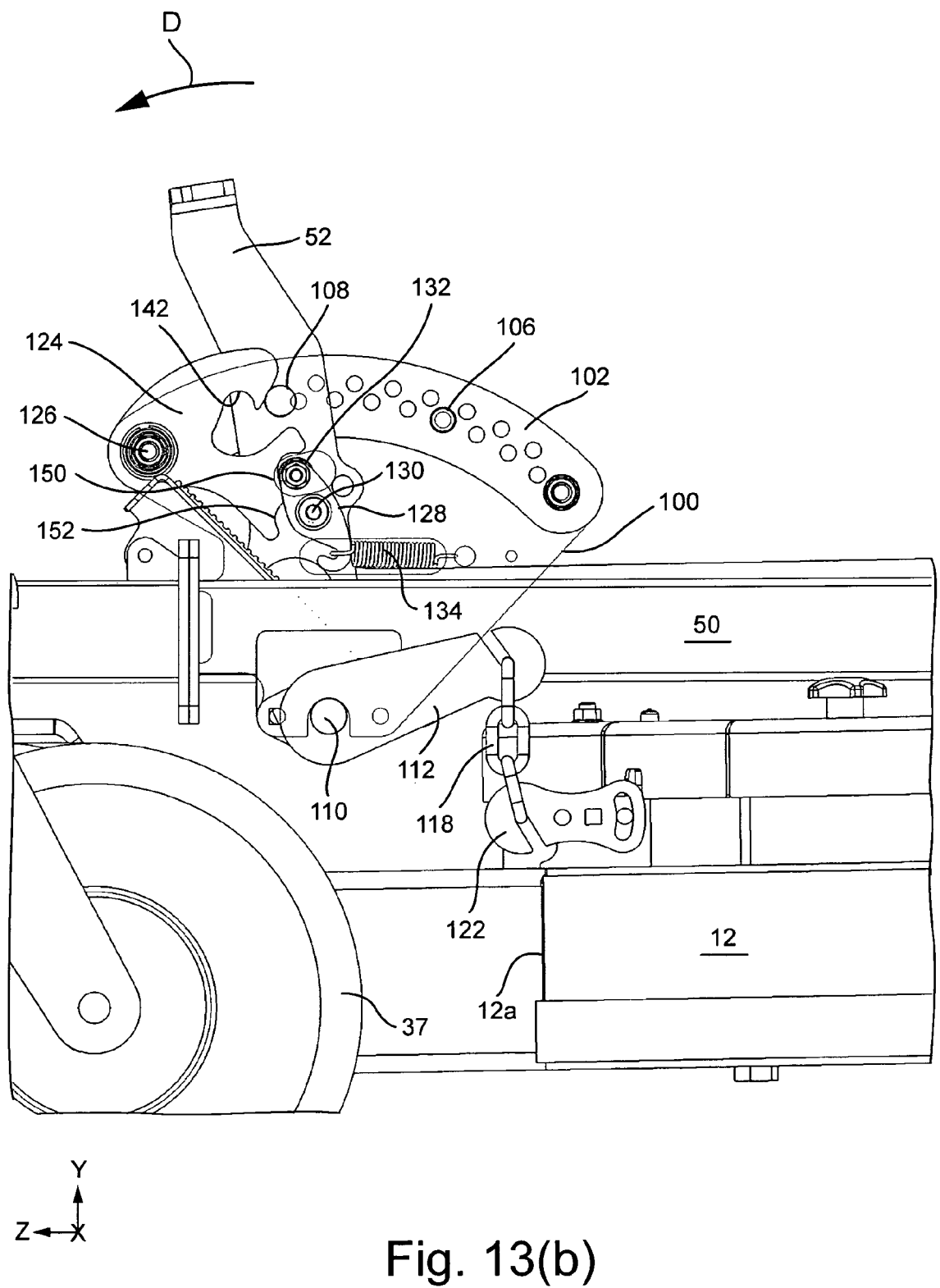
Figure 13C:
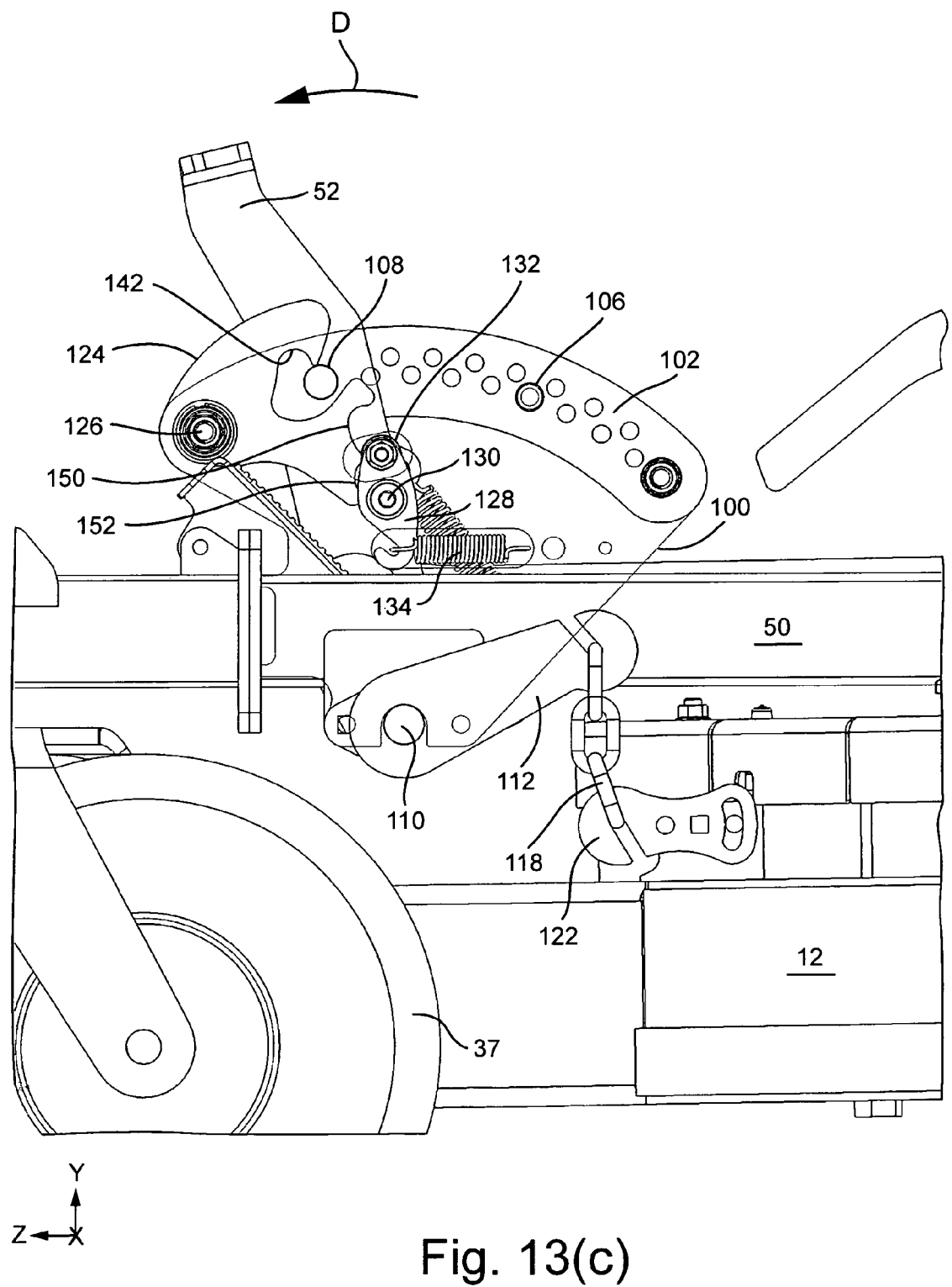
Figure 13D:
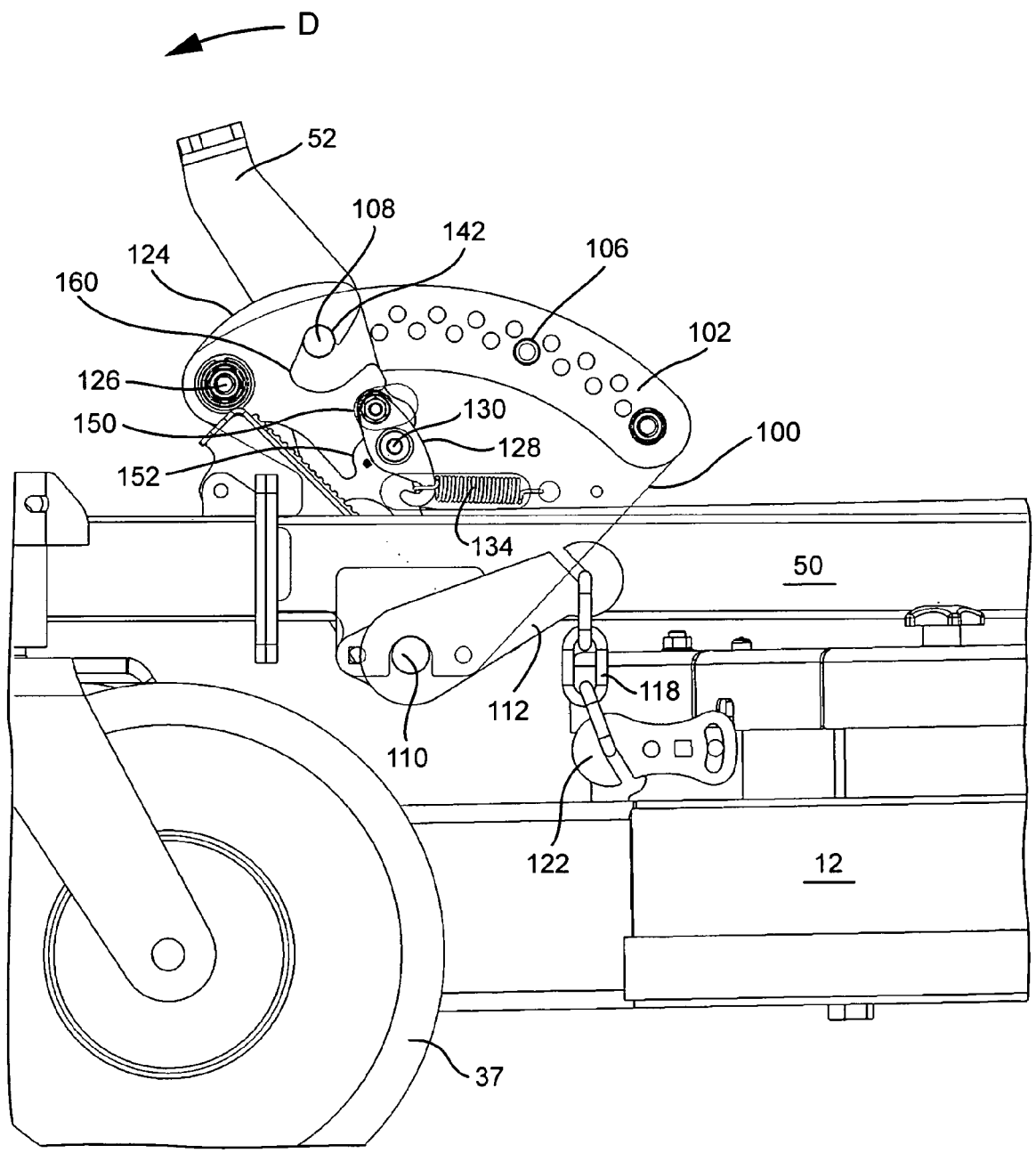

When it is desired to raise a height of the cutter deck assembly 12 (e.g., to move the cutter deck assembly to the storage or transport position, or simply to raise the cutting height), the operator moves lever 52 in the first direction D (e.g., toward the front of the mower in the figures—see direction D in FIGS. 13(a)-13(e)) so that the lever 52 pivots about shaft 110 and moves from the FIG. 13(a) position to the FIG. 13(b) position. This causes deck lift arms 112 and 116 to respectively pivot about deck lift pivot shafts 110 and 120, thereby causing chains 118 to lift the cutter deck assembly 12 upwardly away from the ground at four different lift locations. It can be seen in FIG. 13(b) that the latch pin 108 is now engaging a front edge surface of the latch 124 after deck assembly has been raised to some extent. When the pin 108 first comes into contact with the latch 124 as shown in FIG. 13(b), the latch position retaining roller or bearing 132 mounted on the retaining arm 128 is still being biased into, contacting and resting in first detent 150 defined in the edge of the latch 124. As can be seen in FIGS. 13(b) and 13(c), continued pivoting of the lever in the first direction D toward the front of the mower causes the latch pin 108 to continue moving forward and slide along the edge of latch 124 thereby causing the latch to rotate about latch pivot 126 until the latch pin 108 slips or slides into a hook or latch portion 142 of the latch 124 as shown in FIG. 13(d). Moreover, while this continued movement of the lever 52 in first direction D as shown in FIGS. 13(b)-13(d) causes the roller or bearing 132 to rock to an edge of first detent 150 (FIG. 13(c)), the roller or bearing slips back into the first detent 150 when the pin 108 slips or slides into the latch portion 142 of the latch 124 (FIG. 13(d)). When in the position shown in FIG. 13(d) (and also the position shown in FIGS. 14-19), latch 124 engages and holds the latch pin 108 via its hook or latch portion/surface 142 in order prevent the lever 52 from moving back toward the rear of the mower and thus to hold or latch the cutter deck assembly 12 in a relatively high position which may be representative of either a high cutting height or a storage/transport height. This FIG. 13(d) position (and shown in FIGS. 14-19) may be referred to as the transport or storage position in certain example instances, where the cutter deck assembly 12 is positioned at a relative high elevation relative to the ground.

Figure 13E:
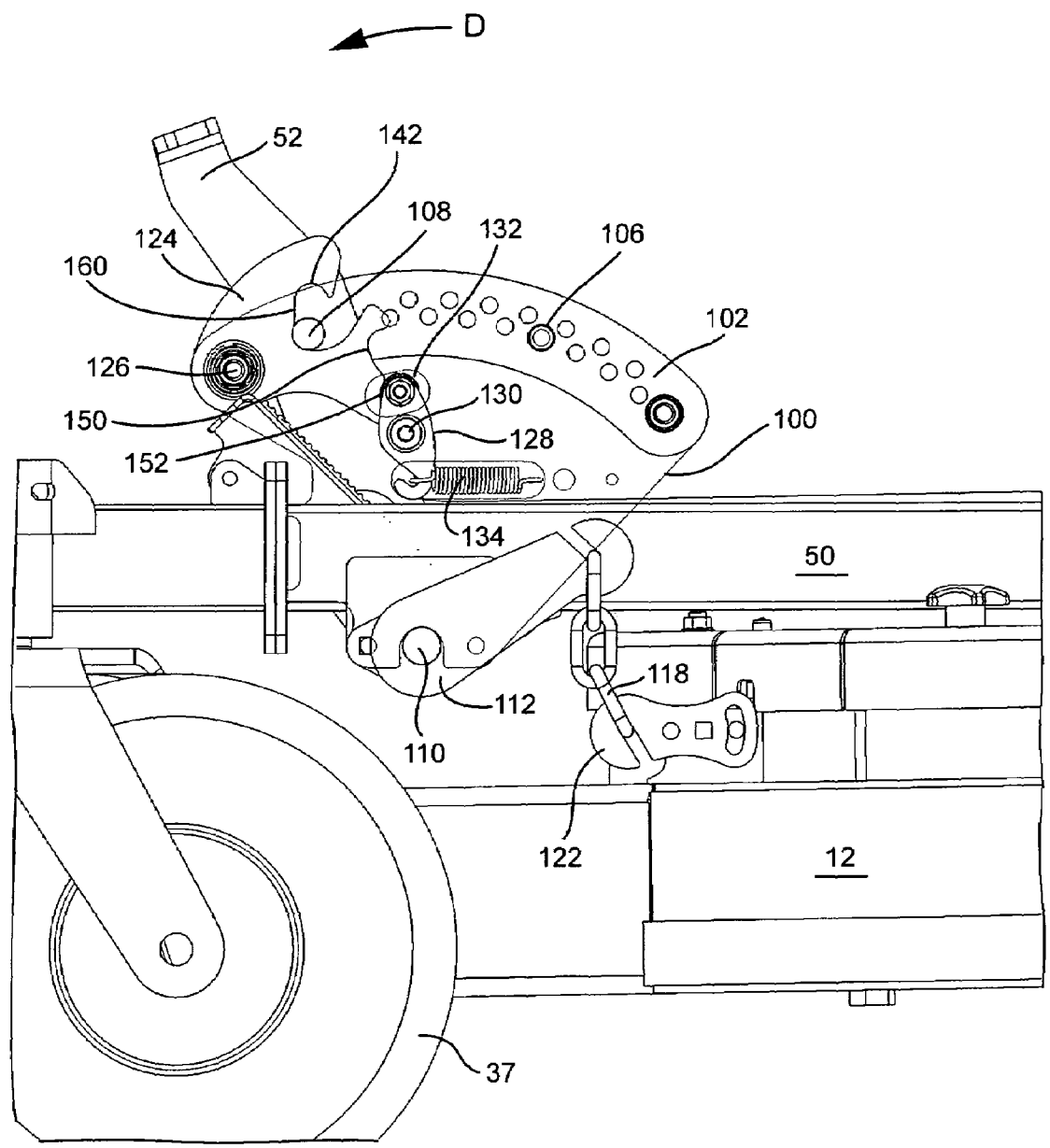
Figure 13F:
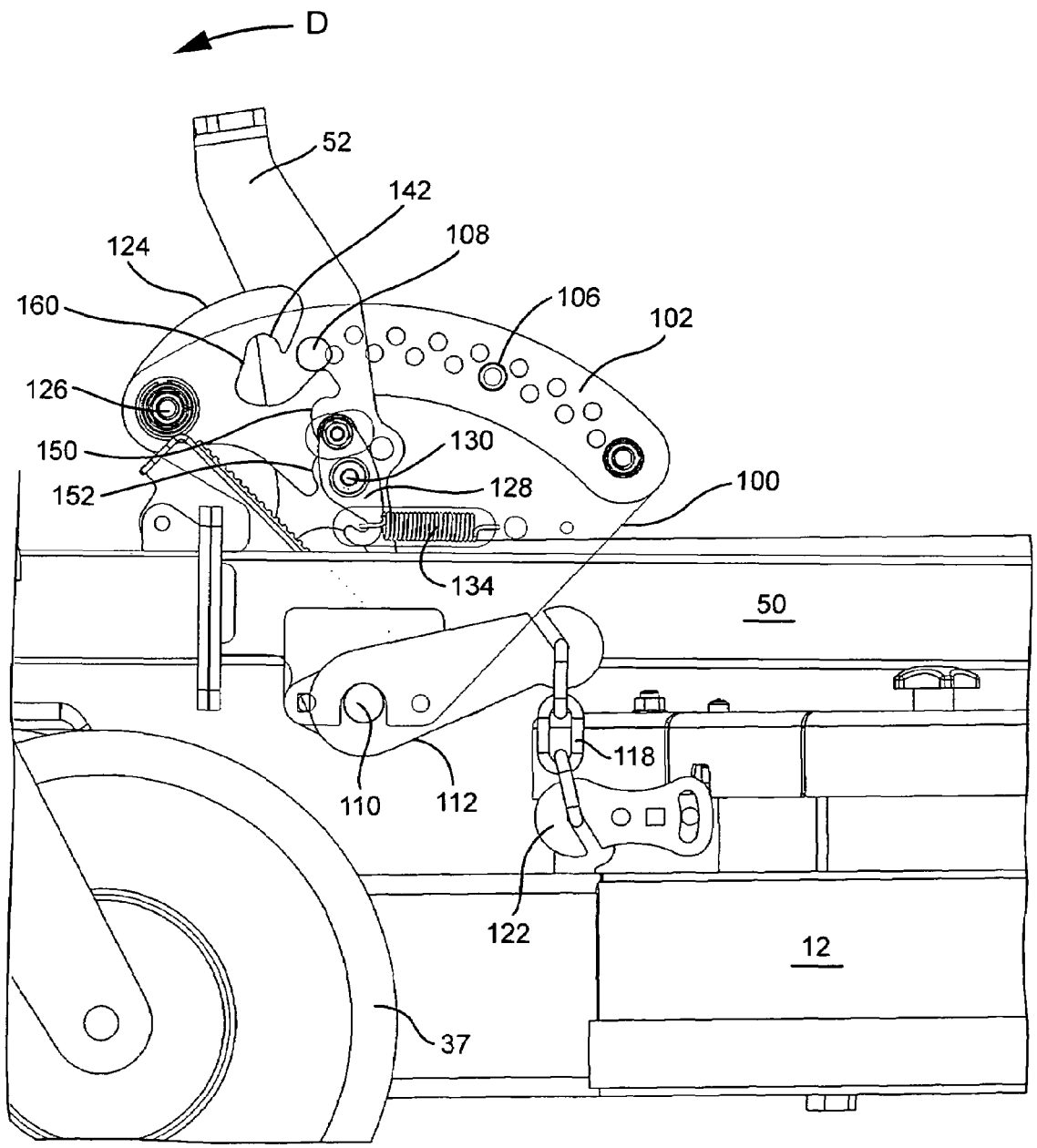
Figure 14:
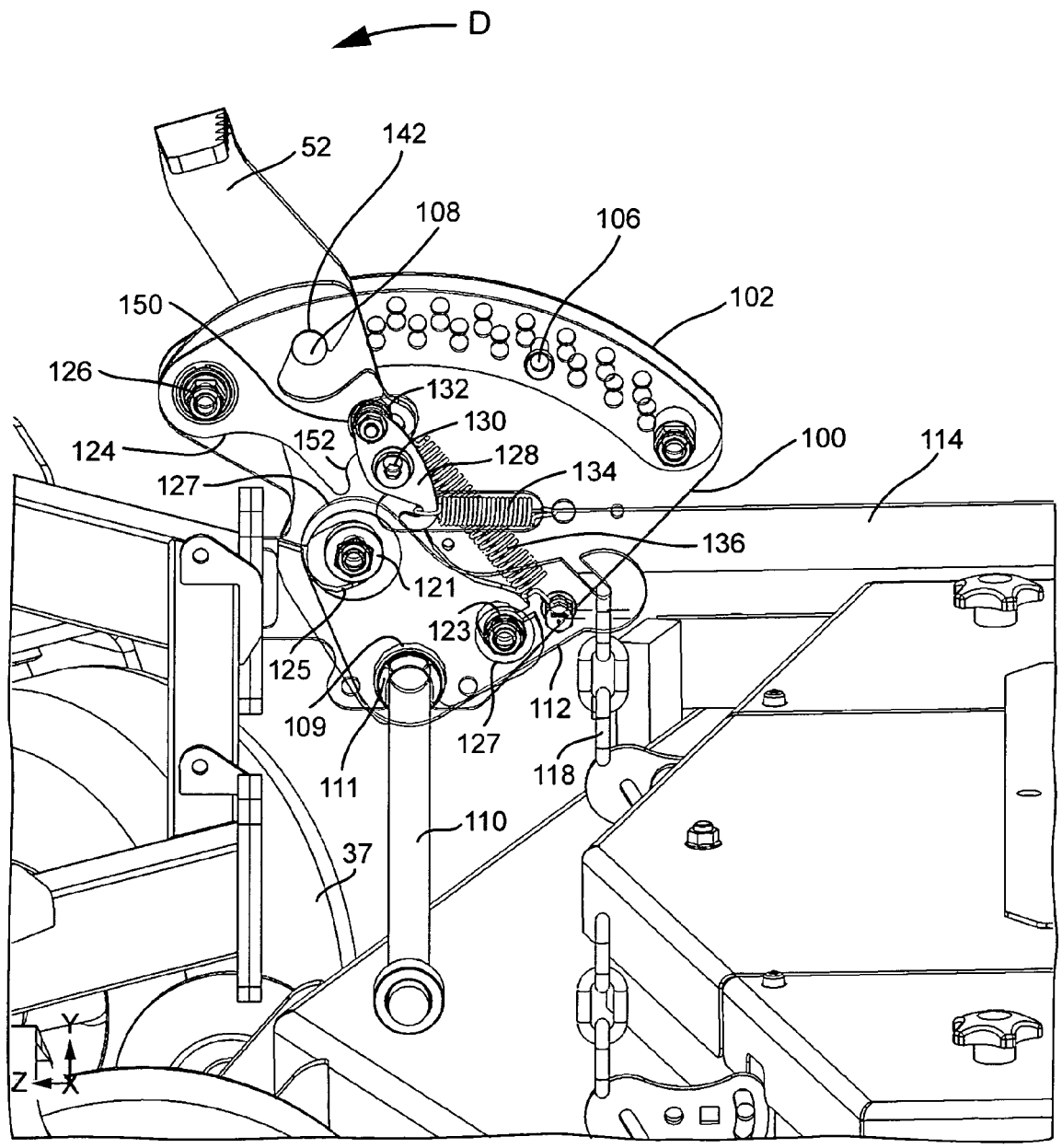
FIG. 14 is a filled in perspective view taken from the left side of the mower of FIGS. 2-13 illustrating the deck lift system according to an example embodiment of this invention; note that the inner height adjustment plate is illustrated in a translucent manner in this figure for purposes of simplicity and understanding, and also that certain components have been omitted from this figure for purposes of simplicity.
Figure 15:
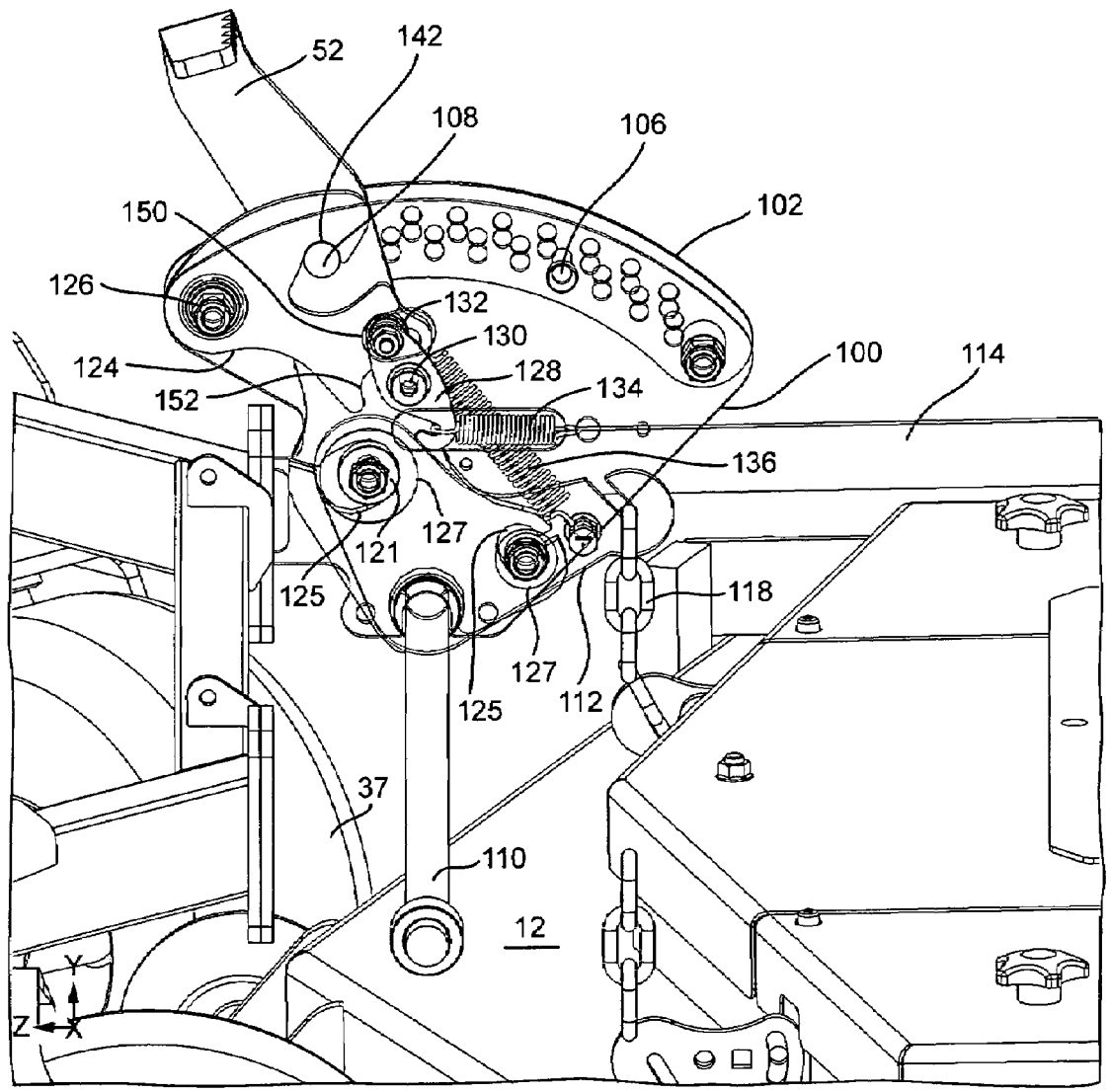
FIG. 15 is a line-drawn perspective view taken from the left side of the mower of FIGS. 2-14 illustrating the deck lift system according to an example embodiment of this invention; note that the inner height adjustment plate is illustrated in a translucent manner in this figure for purposes of simplicity and understanding, and also that certain components have been omitted from this figure for purposes of simplicity.
Figure 16:
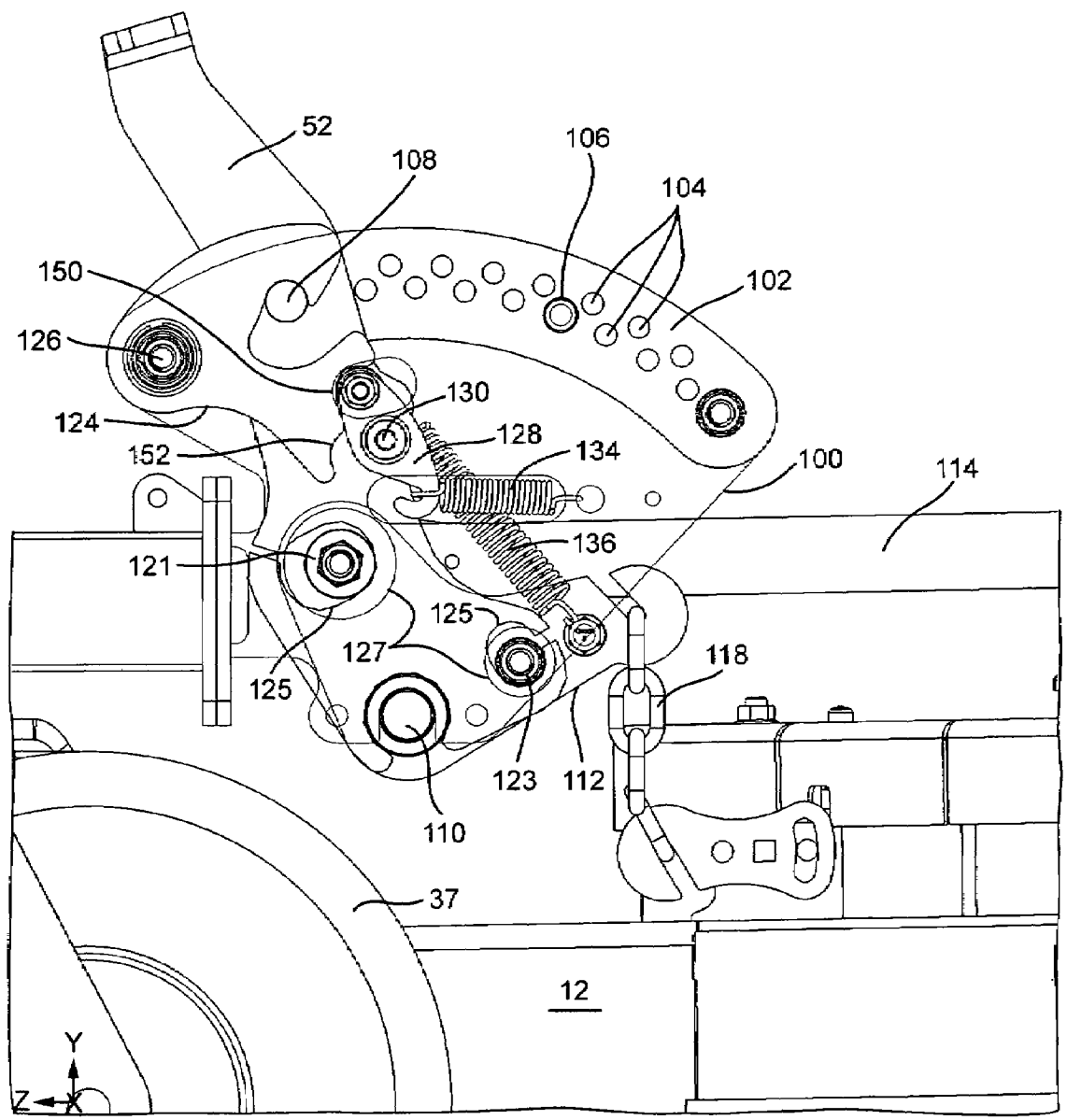
FIG. 16 is a side plan view (taken from the left side of the mower of FIGS. 2-15, and with certain components removed for purposes of illustration and simplicity) illustrating the deck lift system including a transport position retaining system according to an example embodiment of this invention; note that the inner height adjustment plate is illustrated in a translucent manner in these figures for purposes of simplicity and understanding, and also that certain components have been omitted from this figure for purposes of simplicity.
Figure 17:
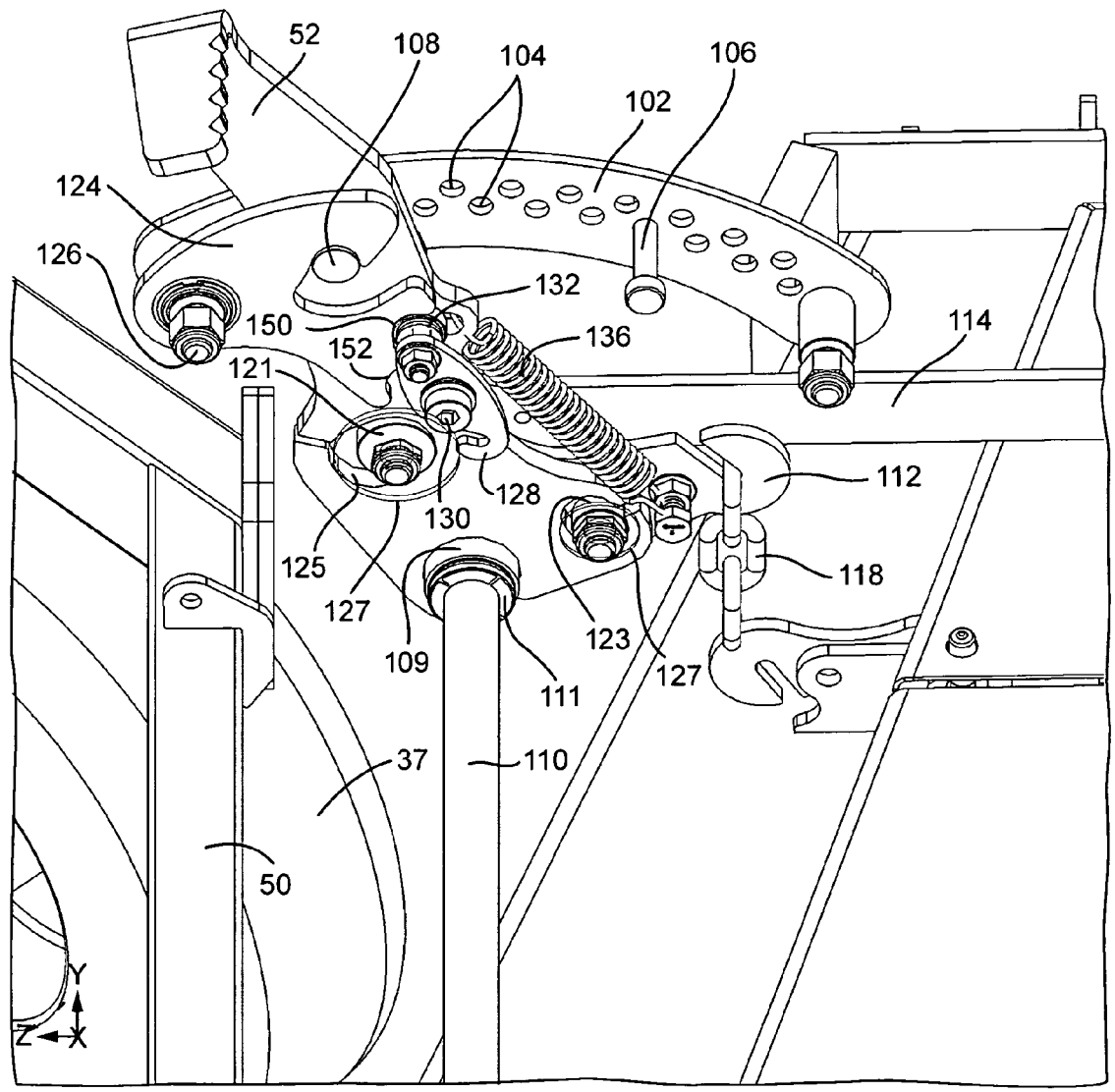
FIG. 17 is a perspective view, taken from above and from the left side, of the deck lift system including the transport position retaining system of the mower of FIGS. 2-16 (note that certain components, e.g., tractor frame, inner height adjustment plate, latch spring, etc., have been omitted from this figure for purposes of simplicity).
Figure 18:
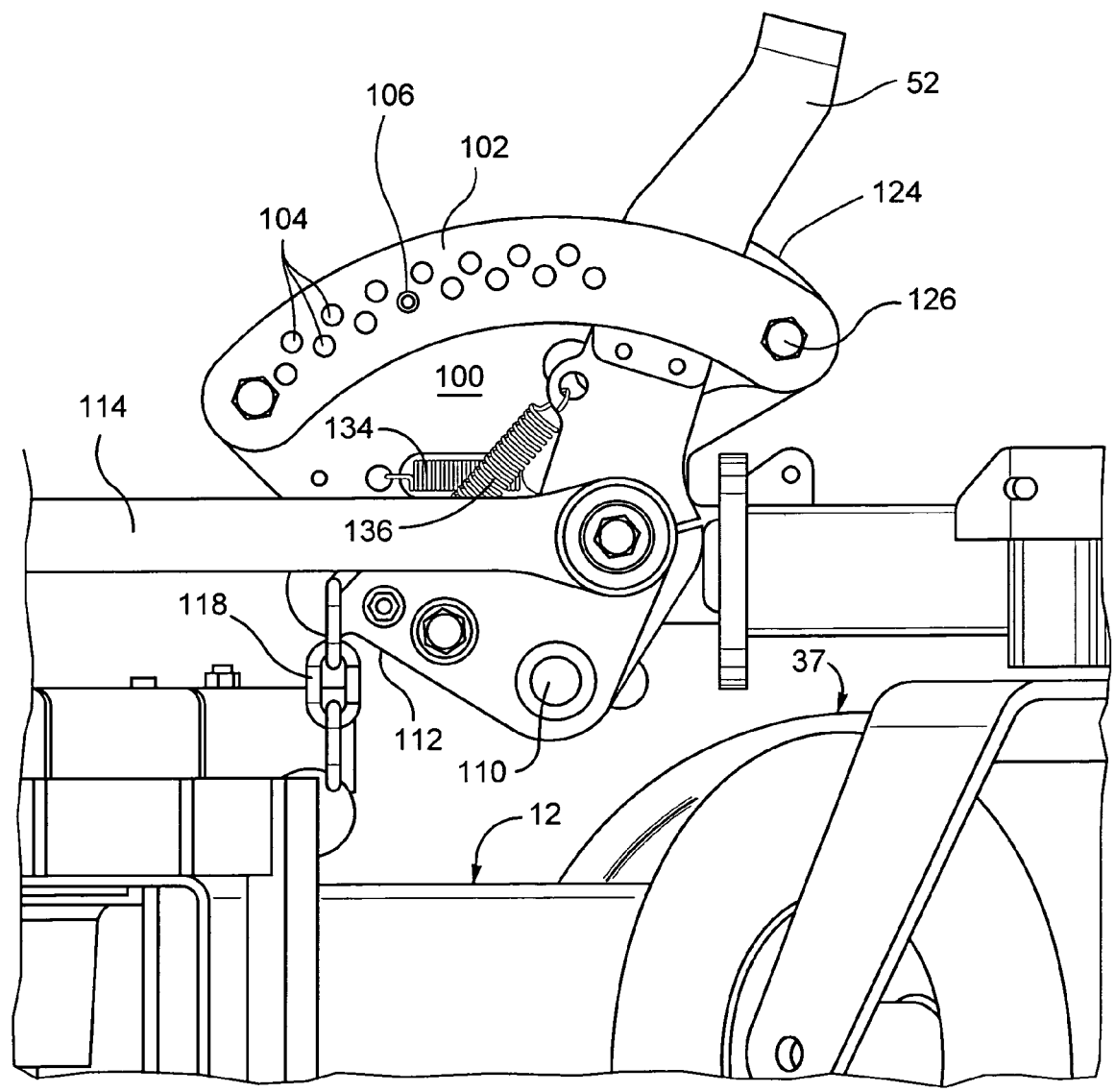
FIG. 18 is a plan view taken from the right side of the mower of FIGS. 2-17, illustrating certain components of the deck lift system including the transport position retaining system according to an example embodiment of this invention.
Figure 19:
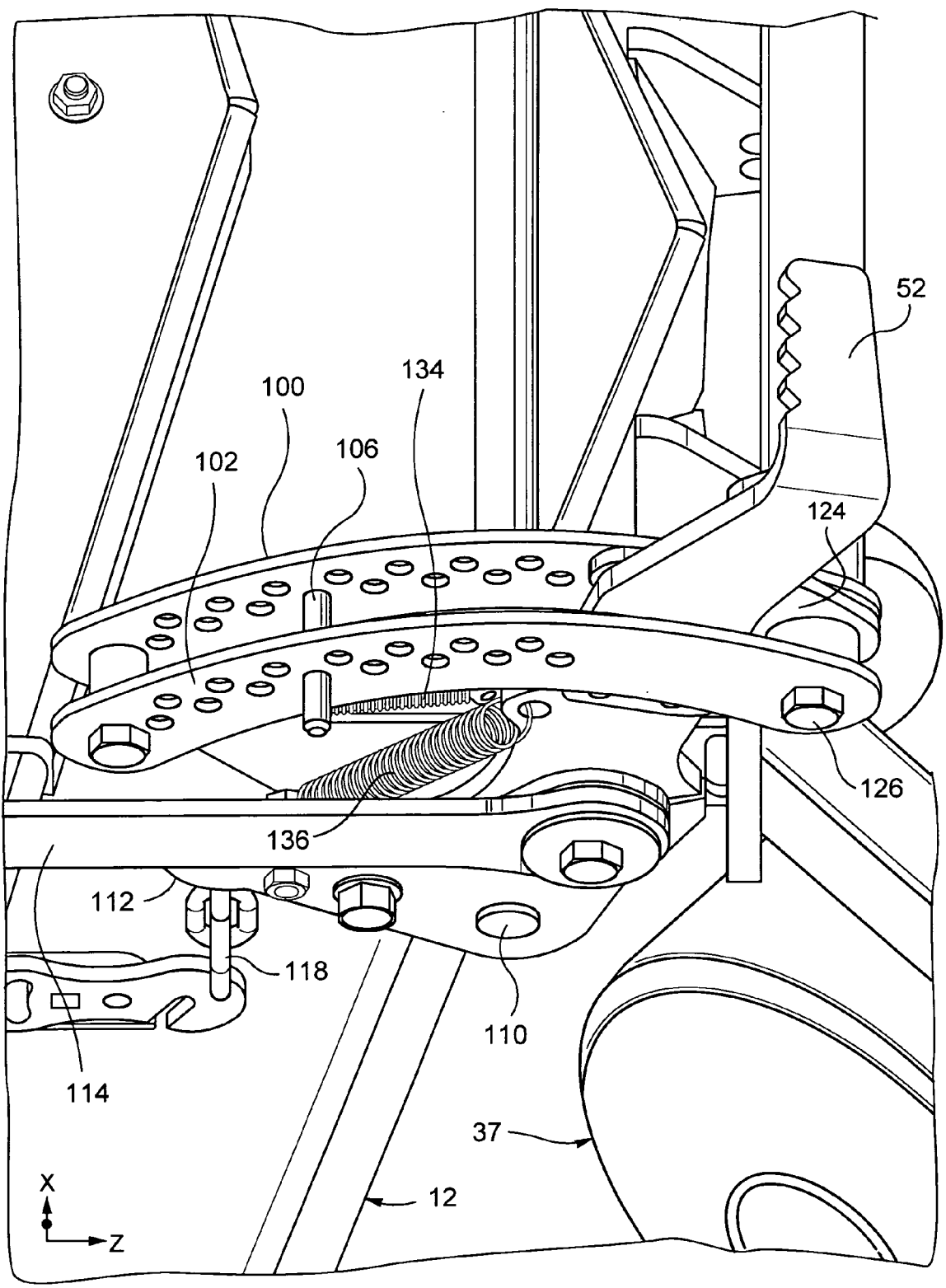
FIG. 19 is perspective view, taken from above and to the right of the mower of FIGS. 2-18, illustrating certain components of the deck lift system including the transport position retaining system according to an example embodiment of this invention.

When an operator desires to move/lower the cutter deck assembly 12 from the storage/transport position (e.g., see FIGS. 13(d) and 14-19) to a cutting position (e.g., see FIG. 13(a)), the operator presses lever 52 still further in the first direction D (e.g., toward the front of the mower in the figures) so that the lever 52 pivots about shaft 110 and latch pin 108 moves from the FIG. 13(d) position toward the front of the mower and to the FIG. 13(e) position. This causes the latch pin 108 to slide along the interior substantially U-shaped surface 160 of the latch interior to the position shown in FIG. 13(e) and thus to be disengaged with the hook or latch portion 142 of the latch. The pressure of the pin 108 on the surface 160 of the latch in this respect also causes the latch 124 to pivot about latch pivot 126 in direction D from the FIG. 13(d) position to the FIG. 13(e) position, and when this occurs the roller or bearing 132 of arm 128 moves out of the first detent 150 and moves to the apex between the first and second detents 150, 152 and preferably at least partially into second detent 152 while continuing to apply a biasing force against the latch 124. The FIG. 13(e) position is essentially the furthest that lever 52 can reasonably be pushed in direction D because the latch prevents further movement of the lever 52 and pin 108 in the first direction D from this point. Thus, the operator is forced to release or ease up on the lever 52 which causes the weight of the cutter deck assembly 12 to pull the lever 52 back in the second direction D2 (toward the rear of the mower in the figures; see direction D2 in FIG. 13(f)) as the lever 52 pivots in the opposite direction about axis 110. The movement of the lever 52 and pin 108 in the second direction D2 away from the latch pivot 126 causes the pin 108 to slide along the rest of interior surface 160 of the latch from the FIG. 13(e) position to the FIG. 13(f) position while the biasing of arm 128 and the position of the pin 108 prevent the hook portion 142 of the latch from catching the pin 108. Continued movement of the lever 52 in the second direction from the FIG. 13(f) position to the FIG. 13(a) grass cutting position causes the pin 108 to disengage from the latch 124 as shown in FIG. 13(a) and the edge of lever 52 comes to rest on stop 106 which sets the cutting height of the mower. As the pin 108 disengages from the latch 124 and the lever 52 returns to the FIG. 13(a) grass cutting position, the biasing lever 128 automatically resets and retains the latch 124 in a position ready to again receive the pin 106 should the operator desire to again move the cutter deck assembly to the transport or storage position by raising the deck height.

Thus, the system allows the operator to apply light force to the lever 52 (in the same direction D that the force was applied to raise the cutter deck assembly) to remove the deck assembly from the latched or storage position, and after applying this light force in direction D the lever 52 is released or eased up on so that the weight of the cutter deck assembly moves the lever in section direction D2 to lower the deck assembly and biasing forces cause the system to disengage the pin 108 from the hook portion 142 of the latch and automatically reset the latch position as lever 52 and deck assembly 12 are lowered to a cutting position.

As perhaps best shown in FIGS. 14-19, in certain example embodiments of this invention the mower may include a transport position retaining system that is provided to reduce the likelihood of the latch 124 becoming disengaged from the pin 108 when the mower is in the transport or storage position. FIGS. 13(d) and 14-19 illustrate the deck assembly 12 in the transport or storage position, because the deck is at a high elevation and the latch 124 is engaging pin 108 to prevent the deck height from lowering. In this position, the mower may often be transported on a truck or trailer. However, when being transported, trucks or trailers transporting the mower may drive over bumps on the road or the like thereby causing the deck assembly, deck lift arms 112, and chains 118 to jiggle up and down. In order to prevent the cutter deck assembly 12 from unexpectedly dropping due to an accidental disengagement between pin 108 and latch 124 during such transport positions, a transport position retaining system is provided and includes an angularly oriented anti-unlatch spring 136 that biases the deck lift lever 52 and thus the pin 108 into engagement with the hook portion of the latch 124 even when the deck lift arm 112 moves up and down (e.g., as a result of a truck or trailer carrying the mower going over bumps on the road) during typical transport conditions. The anti-unlatch spring(s) 136 keeps biasing pressure on the lever 52 so that the pin 108 cannot become easily disengaged from the latch 124 during typical transport conditions. The anti-unlatch spring 136 is connected between deck lift arm 112 and lever 52 in certain example embodiments of this invention so as to provide a biasing force therebetween; however in alternative embodiments the spring 136 may be attached to another fixed structure instead of arm 112.

In certain example embodiments of this invention, the lawn mower includes first and second drive wheels 43, a first pump 68 for controlling the speed and direction of the first drive wheel (via a non-shown wheel motor), a second pump 68 for controlling the speed and direction of the second drive wheel (via a non-shown wheel motor), the first and second drive wheels 43 being independently drivable via the pumps 68 in both forward and reverse directions so as to permit zero radius turning of the mower. The steering control levers 15, 16 are connected independently to the swash plate of its controlled pump 68 so as to permit the operator to cause variable speeds in forward, reverse and neutral for each drive wheel 43.

As shown in the figures, the engine 58 includes an engine drive shaft 60 extending downwardly, or in any other suitable direction, from a bottom or other side of the engine. The cutter deck drive belt 74 for driving at least one cutting blade of the mower, directly or indirectly, is driven by the engine drive shaft 60 via cutter deck engine pulley 76 and extends between the engine drive shaft 60 at a rear portion of the mower and the cutter deck assembly 12 at a front or mid portion of the mower. The pump belt 90 for driving at least one of the first and second pumps 68 is also driven by the engine drive shaft 60 via pump drive engine pulley 84. While the pump belt 90 drives both pumps 68 in the illustrated example embodiment, it is possible that first and second different pump belts may be provided for driving the first and second pumps, respectively, in alternatively example embodiments of this invention.

The cutter deck drive belt 74 and the pump belt 90 are operable to be positioned substantially parallel (parallel plus/minus about 20 degrees) to one another when viewed from the side, and thus at substantially parallel different elevations, during at least some mower operations. As shown in the figures, the cutter deck drive belt 74 is located at an elevation above an elevation of the pump belt 90. It will be appreciated that the cutter deck drive belt 74 may tilt when the cutter deck assembly 12 is moved upward/downward in order to adjust the height of the mower, but most if not all of the belt 74 is still located at an elevation above that of the pump belt in certain example embodiments of this invention. In this respect, the pumps 68 are mounted on an upper surface of pump deck 70, and the upper surface of the pump deck 70 on which the pumps are mounted is at an elevation below the upper surface of the engine deck 64 on which the engine 58 is mounted. In certain example instances, this may call for the engine shaft 60 being slightly longer than normal. These surfaces of the pump and engine decks are substantially parallel to one another in certain example embodiments of this invention, although this need not be the case in alternative embodiments. In certain example embodiments of this invention, the positioning of the pump belt below that of the cutter deck drive belt permits the engine and/or pumps to be lowered so as to be closer to the ground, which is advantageous in that it permits the center of gravity of the mower to be lowered by permitting the hydro pumps and/or engine of the mower to be positioned at a lower elevation so as to improve hill holding and other similar characteristics of the mower. In certain example non-limiting instances, the positioning of the belts and pulleys discussed herein has permitted the applicant to lower the engine from about two to three inches and to lower the pumps from about five to six inches which has significantly lowered the center of gravity of the mower and provided for a significantly better overall product.

As perhaps best shown in FIGS. 7-9, the pumps 68 are spaced apart from one another on the pump deck 70 with a space provided therebetween, so that the first pump is closer to a right side R of the mower and the second pump is closer to a left side L of the mower. The cutter deck drive belt 74 extends through the space between the pumps 68 (as viewed from above as in FIGS. 7-9) and is thus located at an elevation common with at least part of each of the pumps (as viewed from the side). Further in this respect, the substantially vertically extending cross wall 71 is located between a rear end of the upper surface of the pump deck 70 and a front end of the upper surface of the engine deck 64, and has a hole(s) 75 defined therein, and the cutter deck drive belt 74 extends through the hole 75 defined in the substantially vertically extending wall 71 thereby permitting the belt 74 to be located higher on the mower. These features are advantageous in that they permit an efficient path for the belt 74, and allow the belt 74 to be positioned above the pump belt 90 which is helpful to lower the center of gravity of the mower.

While two pumps 68 are used in the illustrated embodiments of this invention, this invention is not so limited. It is possible that only one pump 68 may be used to drive one or more drive wheels 43 in certain alternative example embodiments of this invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A power lawn mower including a deck lift system for raising and lowering a cutter deck assembly of the mower comprising:
   a pivotal deck lift lever for selectively raising and lowering the cutter deck assembly of the mower when the lever is pivoted about a pivot axis, a latch pin being connected to the deck lift lever for movement therewith;
   a pivotal latch adapted to engage the latch pin;

wherein, when the latch is not contacting the latch pin, a biasing member applies a biasing force against the latch to position the latch in a first position so that the latch is ready to engage the latch pin should an operator raise the cutter deck assembly;

wherein, when the deck lift lever is moved in a first direction to a first extent from a grass cutting position, the latch engages and latches the latch pin in order to hold the cutter deck assembly in a raised position, and when the deck lift lever is moved still further to a second extent in the same first direction force applied against the latch causes the latch to become unlatched from the latch pin thereby releasing the latch pin;

wherein, when weight of the cutter deck assembly causes the lever to move in an opposite second direction along with the latch pin after the latch pin has been released by the latch, the latch is disengaged with the latch pin and the biasing member automatically resets the latch to the first position, and the height of the cutter deck assembly is lowered to a desired grass cutting height as the lever moves in the second direction and comes into contact with a stop member which is for maintaining a grass cutting height of the cutter deck assembly; and wherein the latch includes first and second detents defined adjacent to one another along an edge of the latch, and wherein the biasing member engages the first detent when the latch is in the first position and the latch pin is not engaged with the latch, and the biasing member moves at least partially into the second detent when the deck lift lever is moved to the second extent in the same first direction.

2. The mower of claim 1, wherein the biasing member comprises a spring biased arm including a roller or bearing at an end portion thereof, the roller or bearing engaging the latch and applying biasing force thereto.

3. The mower of claim 1, wherein the latch pin slides along a substantially U-shaped inner surface of the latch when the deck lift lever is moved to the second extent in the same first direction so as to become unlatched from a hook-shaped portion of the latch.

4. The mower of claim 1, wherein the deck lift lever and a deck lift arm are both mounted on a common pivot axis defined by a deck lift pivot shaft.

5. The mower of claim 4, wherein one of the deck lift arm and the deck lift lever is mounted in a floating manner on the deck lift pivot shaft, and the other of the deck lift arm and the deck lift lever is rigidly mounted to the deck lift pivot shaft so as to move therewith.

6. The mower of claim 5, wherein the deck lift lever is mounted in the floating manner on the deck lift pivot shaft.

7. A power lawn mower including a deck lift system for raising and lowering a cutter deck assembly of the mower comprising:

a pivotal deck lift lever for selectively raising and lowering the cutter deck assembly of the mower when the lever is pivoted about a pivot axis, a latch pin being connected to the deck lift lever for movement therewith;

a pivotal latch adapted to engage the latch pin;

wherein, when the latch is not contacting the latch pin, a biasing member applies a biasing force against the latch to position the latch in a first position so that the latch is ready to engage the latch pin should an operator raise the cutter deck assembly;

wherein, when the deck lift lever is moved in a first direction to a first extent from a grass cutting position, the latch engages and latches the latch pin in order to hold the cutter deck assembly in a raised position, and when the deck lift lever is moved still further to a second extent in the same first direction force applied against the latch causes the latch to become unlatched from the latch pin thereby releasing the latch pin;

wherein, when weight of the cutter deck assembly causes the lever to move in an opposite second direction along with the latch pin after the latch pin has been released by the latch, the latch is disengaged with the latch pin and the biasing member automatically resets the latch to the first position, and the height of the cutter deck assembly is lowered to a desired grass cutting height as the lever moves in the second direction and comes into contact with a stop member which is for maintaining a grass cutting height of the cutter deck assembly;

wherein the deck lift lever and a deck lift arm are both mounted on a common pivot axis defined by a deck lift pivot shaft;

Wherein the deck lift lever is mounted in a floating manner on the deck lift pivot shaft, and the deck lift arm is rigidly mounted to the deck lift pivot shaft so as to move therewith; and wherein the deck lift lever has at least one aperture defined therein, and a contact member rigidly attached to the deck lift arm is located at least partially in the aperture, so that when the deck lift lever has been moved to a certain extent in a given direction an edge of the aperture engages the contact member thereby causing the deck lift lever, deck lift arm and deck lift pivot shaft to all move together about an axis defined by the deck lift pivot shaft.

8. The mower of claim 7, wherein the contact member is a spacer.

9. A power lawn mower including a deck lift system for raising and lowering a cutter deck assembly of the mower comprising:

a pivotal deck lift lever for selectively raising and lowering the cutter deck assembly of the mower when the lever is pivoted about a pivot axis, a latch pin being connected to the deck lift lever for movement therewith;

a pivotal latch adapted to engage the latch pin;

wherein, when the latch is not contacting the latch pin, a biasing member applies a biasing force against the latch to position the latch in a first position so that the latch is ready to engage the latch pin should an operator raise the cutter deck assembly;

wherein, when the deck lift lever is moved in a first direction to a first extent from a grass cutting position, the latch engages and latches the latch pin in order to hold the cutter deck assembly in a raised position, and when the deck lift lever is moved still further to a second extent in the same first direction force applied against the latch causes the latch to become unlatched from the latch pin thereby releasing the latch pin;

wherein, when weight of the cutter deck assembly causes the lever to move in an opposite second direction along with the latch pin after the latch pin has been released by the latch, the latch is disengaged with the latch pin and the biasing member automatically resets the latch to the first position, and the height of the cutter deck assembly is lowered to a desired grass cutting height as the lever moves in the second direction and comes into contact with a stop member which is for maintaining a grass cutting height of the cutter deck assembly; and an anti-unlatch spring that biases the latch pin into engagement with the latch so as to reduce the likelihood of the latch pin unlatching from the latch during typical transport conditions of the mower.

10. The mower of claim 9, wherein the latch includes first and second detents defined adjacent to one another along an edge of the latch, and wherein the biasing member engages the first detent when the latch is in the first position and the latch pin is not engaged with the latch, and the biasing member moves at least partially into the second detent when the deck lift lever is moved to the second extent in the same first direction.

11. The mower of claim 9, further comprising a latch position retaining spring which biases the biasing member so that the biasing member applies the biasing force against the latch to position the latch in a manner so that the latch is ready to engage the latch pin should an operator elect to raise the cutter deck assembly, and wherein the latch position retaining spring and the anti-unlatch spring form an angle of from about 20-75 degrees with one another when viewed from the side, more preferably from about 30-60 degrees.

12. A lawn mower comprising:
a deck lift lever for selectively raising and lowering a cutter deck assembly of the mower, an engagement member being connected to the deck lift lever for movement therewith;
a pivotal latch adapted to engage the engagement member;
wherein, when the cutter deck assembly is at a first grass cutting height, a biasing member applies a biasing force against the latch to position the latch in a first position so that the latch is ready to engage the engagement member should an operator raise the cutter deck assembly;
wherein, when the deck lift lever is moved in a first direction to a first extent from a grass cutting position, the latch engages and latches the engagement member in order to hold the cutter deck assembly in a raised position, and when the deck lift lever is moved still further to a second extent in the same first direction the latch becomes unlatched from the engagement member; and
wherein, when the deck lift lever moves in an opposite second direction along with the engagement member after the engagement member has been released by the latch, the biasing member resets the latch to the first position; and
an anti-unlatch spring that biases the engagement member into engagement with the latch so as to reduce the likelihood of the engagement member unlatching from the latch during typical transport conditions of the mower.

13. The mower of claim 12, wherein the engagement member comprises a latch pin which extends outwardly from a main body portion of the deck lift lever.

14. The mower of claim 12, wherein the biasing member comprises a spring biased arm including a roller or bearing at an end portion thereof, the roller or bearing engaging the latch and applying biasing force thereto.

15. The mower of claim 12, wherein the engagement member slides along a substantially U-shaped inner surface of the latch when the deck lift lever is moved to the second extent in the same first direction so as to become unlatched from a hook-shaped portion of the latch.

16. The mower of claim 12, wherein the deck lift lever and a deck lift arm are both mounted on a common pivot axis defined by a deck lift pivot shaft.

17. The mower of claim 16, wherein one of the deck lift arm and the deck lift lever is mounted in a floating manner on the deck lift pivot shaft, and the other of the deck lift arm and the deck lift lever is rigidly mounted to the deck lift pivot shaft so as to move therewith.

18. The mower of claim 17, wherein the deck lift lever is mounted in the floating manner on the deck lift pivot shaft.

19. The mower of claim 18, wherein the deck lift lever has at least one aperture defined therein, and a contact member rigidly attached to the deck lift arm is located at least partially in the aperture, so that when the deck lift lever has been moved to a certain extent in a given direction an edge of the aperture engages the contact member thereby causing the deck lift lever, deck lift arm and deck lift pivot shaft to all move together about an axis defined by the deck lift pivot shaft.

20. The mower of claim 12, further comprising a latch position retaining spring which biases the biasing member so that the biasing member applies the biasing force against the latch to position the latch in a manner so that the latch is ready to engage the engagement member should an operator elect to raise the cutter deck assembly, and wherein the latch position retaining spring and the anti-unlatch spring form an angle of from about 20-75 degrees with one another when viewed from the side, more preferably from about 30-60 degrees.

21. A lawn mower comprising:
a deck lift lever for selectively raising and lowering a cutter deck assembly of the mower, an engagement member being connected to the deck lift lever for movement therewith;
a pivotal latch adapted to engage the engagement member;
wherein, when the cutter deck assembly is at a first grass cutting height, a biasing member applies a biasing force against the latch to position the latch in a first position so that the latch is ready to engage the engagement member should an operator raise the cutter deck assembly;
wherein, when the deck lift lever is moved in a first direction to a first extent from a grass cutting position, the latch engages and latches the engagement member in order to hold the cutter deck assembly in a raised position, and when the deck lift lever is moved still further to a second extent in the same first direction the latch becomes unlatched from the engagement member; and
wherein, when the deck lift lever moves in an opposite second direction along with the engagement member after the engagement member has been released by the latch, the biasing member resets the latch to the first position; and
wherein the latch includes first and second detents defined adjacent to one another along an edge of the latch, and wherein the biasing member engages the first detent when the latch is in the first position and the engagement member is not engaged with the latch, and the biasing member moves at least partially into the second detent when the deck lift lever is moved to the second extent in the same first direction.

* * * * *